US009459765B2

United States Patent
Carapella et al.

(10) Patent No.: US 9,459,765 B2
(45) Date of Patent: Oct. 4, 2016

(54) GRAPHICAL USER INTERFACE FOR SEARCH REQUEST MANAGEMENT

(75) Inventors: Sean Peter Carapella, Somerville, MA (US); Christine Ann Daniels, Milton, MA (US); Michelle Marguerite Mott, Rockland, MA (US); Chandrah Lee Raleigh, Adelanto, CA (US); Mahenthiran Venugopal, Waltham, MA (US)

(73) Assignee: AMADEUS S.A.S., Biot (FR)

( * ) Notice: Subject to any disclaimer, the term of this patent is extended or adjusted under 35 U.S.C. 154(b) by 737 days.

(21) Appl. No.: 12/398,437

(22) Filed: Mar. 5, 2009

(65) Prior Publication Data
US 2010/0223562 A1    Sep. 2, 2010

(30) Foreign Application Priority Data

Feb. 27, 2009  (EP) .................................. 09305180

(51) Int. Cl.
*G06Q 10/02* (2012.01)
*G06F 3/0482* (2013.01)
*G06Q 30/06* (2012.01)
*G06F 3/0484* (2013.01)
*G06F 17/30* (2006.01)
*G06F 3/0481* (2013.01)

(52) U.S. Cl.
CPC ........... *G06F 3/0482* (2013.01); *G06F 3/0484* (2013.01); *G06F 17/30864* (2013.01); *G06Q 10/02* (2013.01); *G06Q 30/0603* (2013.01); *G06F 3/0481* (2013.01)

(58) Field of Classification Search
CPC ...................................................... G06F 3/0481
USPC .................................................. 715/760, 846
See application file for complete search history.

(56) References Cited

U.S. PATENT DOCUMENTS 5,634,053 A    5/1997 Noble et al.
5,781,892 A    7/1998 Hunt et al.
(Continued)

FOREIGN PATENT DOCUMENTS

CA    2184937    3/1997
CN    1790326 A    6/2006
(Continued)

OTHER PUBLICATIONS

U.S. Appl. No. 61/148,039, filed Jan. 28, 2009.*
International Search Report, dated Mar. 22, 2010 in Application No. PCT/EP2010/051983.
(Continued)

*Primary Examiner* — Sherrod Keaton
(74) *Attorney, Agent, or Firm* — Thompson Hine LLP

(57) ABSTRACT

A computer apparatus includes i) a graphical user interface with a first command interface area for inputting and displaying cryptic commands for the definition of a search request and a form-based second command interface area having fields for displaying parameters of the search request, and ii) a coupling part for coupling the first and the second command interface areas such that the input of cryptic commands generates a pseudo-simultaneous display of parameters reflecting at least some of the cryptic commands, the elements for coupling including elements for parsing the cryptic commands, program instructions for extracting structured data from the cryptic commands, elements for storing the structured data within JavaScript objects, and program instructions for filling fields of the second command interface area by mapping the structured data.

29 Claims, 26 Drawing Sheets

(56) References Cited

U.S. PATENT DOCUMENTS

| | | | |
|---|---|---|---|
| 5,842,176 A | 11/1998 | Hunt et al. | |
| 6,233,586 B1 | 5/2001 | Chang et al. | |
| 6,529,909 B1 | 3/2003 | Bowman-Amuah | |
| 6,857,023 B2 | 2/2005 | Rivadalla et al. | |
| 7,007,275 B1 | 2/2006 | Hanson et al. | |
| 8,032,823 B2* | 10/2011 | Tomasic et al. | 715/226 |
| 2002/0077871 A1* | 6/2002 | Udelhoven | G06Q 10/02 705/5 |
| 2002/0156629 A1 | 10/2002 | Carberry et al. | |
| 2003/0105653 A1* | 6/2003 | Jafri | G06Q 10/02 705/5 |
| 2004/0153347 A1* | 8/2004 | Kunze et al. | 705/4 |
| 2006/0253785 A1* | 11/2006 | Dowling | 715/738 |
| 2007/0011668 A1* | 1/2007 | Wholey et al. | 717/151 |
| 2007/0168854 A1 | 7/2007 | de Marcken et al. | |
| 2007/0185831 A1* | 8/2007 | Churcher | 707/3 |
| 2007/0234228 A1* | 10/2007 | Rao et al. | 715/771 |
| 2008/0077560 A1 | 3/2008 | Comi et al. | |
| 2008/0168093 A1* | 7/2008 | De Marcken | 707/104.1 |
| 2009/0055738 A1 | 2/2009 | Acedo et al. | |
| 2009/0158153 A1 | 6/2009 | Courteaux | |
| 2009/0172541 A1* | 7/2009 | Acedo et al. | 715/708 |
| 2009/0288040 A1* | 11/2009 | Wilson | 715/846 |
| 2010/0191553 A1* | 7/2010 | McIntosh et al. | 705/5 |

FOREIGN PATENT DOCUMENTS

| | | |
|---|---|---|
| EP | 1672539 | 6/2006 |
| JP | 2002505482 A | 2/2002 |
| JP | 2003536175 A | 12/2003 |
| JP | 2006172435 A | 6/2006 |
| JP | 2007114935 A | 5/2007 |
| WO | 0199022 A2 | 12/2001 |

OTHER PUBLICATIONS

Search Report issued in Singapore Application No. 201106113-2.
Japan Patent Office, Official Action issued in Japanese application No. 2011-551462 dated Dec. 27, 2013.
European Patent Office, Search Report issued in Application No. EP 09 30 5180 dated Aug. 28, 2009.
European Patent Office, Official Action issued in Application No. 09 305 180.3 dated Jun. 3, 2014.
European Patent Office, Search Report issued in Application No. 09 305 180.3 dated Jul. 9, 2009.
Japan Patent Office, Official Action issued in Application No. 2011-551462 dated Sep. 16, 2014.
China Patent&Trademark Office, Official Action issued in Chinese Application No. 201080014780.5 dated Jun. 20, 2013.
Canadian Intellectual Property Office, Official Action issued in Application No. 2,753,676 Mar. 12, 2016.

* cited by examiner

GRAPHICAL USER INTERFACE FOR SEARCH REQUEST MANAGEMENT

FIELD OF THE INVENTION

The present invention relates to a computer apparatus, method and computer program product providing a graphical user interface for the management of search requests.

One application is the processing of search and booking requests for various transportation means such as, but not limited to, air or car and for other aspects of a trip such as, but not limited to, hotel accommodations.

BACKGROUND OF THE INVENTION

Travel requests are typically conducted via inputs to a computer device, such as a personal computer, and these inputs are then sent to a search engine of a computerized system such as a Global Distribution System (GDS) for processing purposes. Major GDSs are known under the following trademarks: Amadeus, Sabre, Apollo and Worldspan. The GDSs are capable of replying with travel solutions matching the user's request. Users typically are travel agents skilled in translating the travel criteria of their clients into a computer request format compatible with the GDS with which they are used to working. The travel agent is required to type GDS-specific commands, known as cryptic commands, on a computer keyboard to dialog with a software application using a command line (i.e. text-based) user interface.

Within the past two decades, more user-friendly, graphical interfaces have been developed. These interfaces offer new possibilities for building search requests to users who have no knowledge of the cryptic formats used by the GDSs. In addition, providing a graphical user interface, or GUI, has now become standard for all software applications developed since at least the beginning of the 1990's on most modern operating systems (OS) including Microsoft Windows, Apple Macintosh OS (registered Trademarks) and all derivatives of UNIX, the time-sharing OS originally conceived at Bell Laboratories. GUI components include images, icons, dialog boxes, etc. on screen windows. The user can control the application by moving a pointer on the screen or using keyboard equivalents and selecting GUI components while pointing at them or by using keyboard equivalents. This interface is in contrast to the command line interface, whereby communication is achieved through an exchange of text strings.

The GUI is often preferred because command line interfaces require that numerous commands be learned and remembered by the user of a software application before she or he can use it efficiently. However, once mastered, command line commands can enable significantly faster interaction with the system. Cryptic commands are indeed often more efficient for very skilled users such as expert travel agents. Today, experienced travel agents use cryptic language commands which are unique to each of the GDSs. Travel agents are generally more comfortable with one cryptic language than another. In a multi-GDS/multi-content travel procurement environment, however, it is essential for these agents to be able to work in other languages as dictated by those sources. Different global distribution systems and travel reservation sources have access to different content and some travel agency clients will require that their travel bookings be reserved in a specific GDS/source in order to obtain discounts or preferred rates. Therefore, having access to many GDSs/sources is a strong requirement for travel agencies.

Experienced travel agents are quicker and more efficient using a cryptic command line entry than form-based fields in a GUI environment. Commands can take very few keystrokes to obtain results and there is generally no scrolling or clicking required with cryptic commands. If an agent does not know a command, however, cryptic is not as efficient as a GUI because commands are not intuitively obvious and the agent needs to access the help environment to find the GDS command. Inexperienced agents have two options—1) to learn one or more GDS languages through extensive training, or 2) to use a completely graphical, user-friendly, but less efficient, booking tool. A system is needed that would combine the advantages of both of these options.

The invention proposes a new apparatus, method and computer program which intend to reach this goal. According to the invention a new GUI combines a first command interface area dedicated to cryptic commands and a second command interface area having a form-based design. By combining the two interfaces, the invention provides a new experience to the user who can enter cryptic commands in one command interface area of the UI and dynamically see the effect of his/her input in a friendly manner in a second command interface area. In a preferred embodiment, the user can use either command interface area as an input interface, and thereby select the interface most adapted to his or her needs and skills. The invention is also capable of converting a cryptic request so that it is compatible with any GDS, independent of the original cryptic language format entered by the agent. This means that travel requests can be entered in any GDS cryptic language, converted into the form-based input, and then sent to the search (or travel booking) engine which may request content from, or make the reservation with, any GDS or content source. As an example, with this functionality, an agency can have 5 different agents (1 Sabre expert, 1 Worldspan expert, 1 Apollo expert, 1 Amadeus expert, and 1 inexperienced agent) all using the same tool and requesting and receiving the same information from whatever content sources have been configured in the rules and administration engine without needing to be retrained on a new GDS language. Another objective of the invention is to standardize data stream exchanged between the client applications and server. In another preferred embodiment using web applications, the parsing and processing of the travel requests can be handled by logic and code embedded within the form.

Further objects, features and advantages of the invention will become apparent to the ones skilled in the art upon examination of the following description in reference to the accompanying drawings.

SUMMARY OF THE INVENTION

The invention relates to a computer apparatus for generating a graphical user interface on a display screen. The graphical user interface, or GUI, comprises a first command interface area for inputting and displaying cryptic commands for the definition of a search request, and a form-based second command interface area having fields for displaying parameters of the search request.

The computer apparatus further comprises means for coupling the first and the second command interface areas such that the input of cryptic commands in the first command interface area generates a pseudo-simultaneous display of parameters reflecting at least some of the cryptic commands. More precisely, the coupling means may involve the following features:
- means for parsing the cryptic commands,
- program instructions for extracting structured data from the cryptic commands,
- means for storing the structured data within JavaScript objects,
- program instructions for filling fields of the second command interface area by mapping the structured data.

In a preferred embodiment, the second command interface area allows for the input of parameters of the search request and the means for coupling are configured to generate a pseudo-simultaneous display of cryptic commands reflecting at least some of the graphical input parameters.

According to further optional aspects of this apparatus:
- at least the second graphical input command interface area is embedded in a Hyper Text Mark-up Language page,
- it comprises program instructions for generating a visual indication of a parsing status of the cryptic commands,
- the first command interface area comprises means for selecting a code type of cryptic commands and the means for parsing comprise a set of parsers each dedicated to a code type of cryptic commands,
- it comprises means for creating a query in a canonical format on the basis of the structured data and means for converting the query into a search request in a code type of cryptic commands compatible with a remote search engine,
- the graphical user interface is a web page generated by a web application,
- the means for coupling are embedded within the web page.

The invention also concerns a method for generating a graphical user interface on a display screen comprising the steps of:
- in a first area of the display screen, displaying a first command interface for inputting and displaying cryptic commands for the definition of a search request,
- in a second area of the display screen, displaying a form-based second command interface having fields for displaying parameters of the search request,
- coupling the first and second command interface areas such that the input of cryptic commands in the first command interface area generates a pseudo-simultaneous display of parameters reflecting at least some of the cryptic commands.

Optionally the method may also include any of the features indicated below:
- the step of coupling comprises parsing the cryptic commands,
- the step of coupling comprises extracting structured data from the parsed cryptic commands,
- the step of coupling comprises storing said structured data within JavaScript objects,
- the step of coupling comprises filling fields of the second command interface area by mapping the structured data,
- it comprises the steps of inputting parameters of the search request on the second command interface area and coupling the first and second command interface areas to generate a pseudo-simultaneous display of cryptic commands reflecting at least some of the input parameters,
- it comprises the steps of creating a query in a canonical format on the basis of the structured data and of converting the query into a search request in a code type of cryptic commands compatible with a remote search engine,
- the remote search engine is part of a computerized travel reservation system,
- the search request is transmitted directly to the remote search engine,
- the search request is communicated to an intermediary engine for application of travel policy rules and then transmitted to the remote search engine,
- the cryptic commands input on the first command interface area are of a first code type which is not compatible with the remote search engine,
- the steps of returning travel solutions to the graphical user interface in reply to the search request and displaying the travel solutions with fields codes of the first code type,
- it comprises the steps of returning travel solutions to the graphical user interface in reply to the search request and simultaneously displaying the travel solutions and at least one of the first and second interfaces for the input of follow up commands,
- it comprises the step of defining a bypass code and the step of sending the cryptic commands to a remote search engine without the step of extracting structured data each time the bypass code is detected during the step of parsing the cryptic commands.

A third aspect of the invention is a computer program product comprising computer executable instructions for causing a computer to operate the method of the invention.

BRIEF DESCRIPTION OF THE DRAWINGS

FIGS. 6 to 26 illustrate examples of GUI generated according to the invention.

DETAILED DESCRIPTION

The following detailed description refers to the accompanying drawings. While the description includes exemplary embodiments, other embodiments are possible, and changes may be made to the embodiments described without departing from the spirit and scope of the invention.

The apparatus of the invention can be implemented within a conventional personal computer, the later comprising a display screen, input means such as a keyboard and a pointer like a mouse, and communication means. Communication means typically include hardware for transmission over a network and software components such as a browser (e.g. Netscape®, Internet Explorer® or the like).

A GUI is provided for building requests such as requests for travel products, for availability, for booking travel products etc. The requests are then handled by a remote system typically a search engine of a server part of one GDS.

To generate GUI on the display screen, the invention may operate as a web application supported by a web browser like the ones previously cited and produce web pages embedding the required logic and code.

Figure 1:
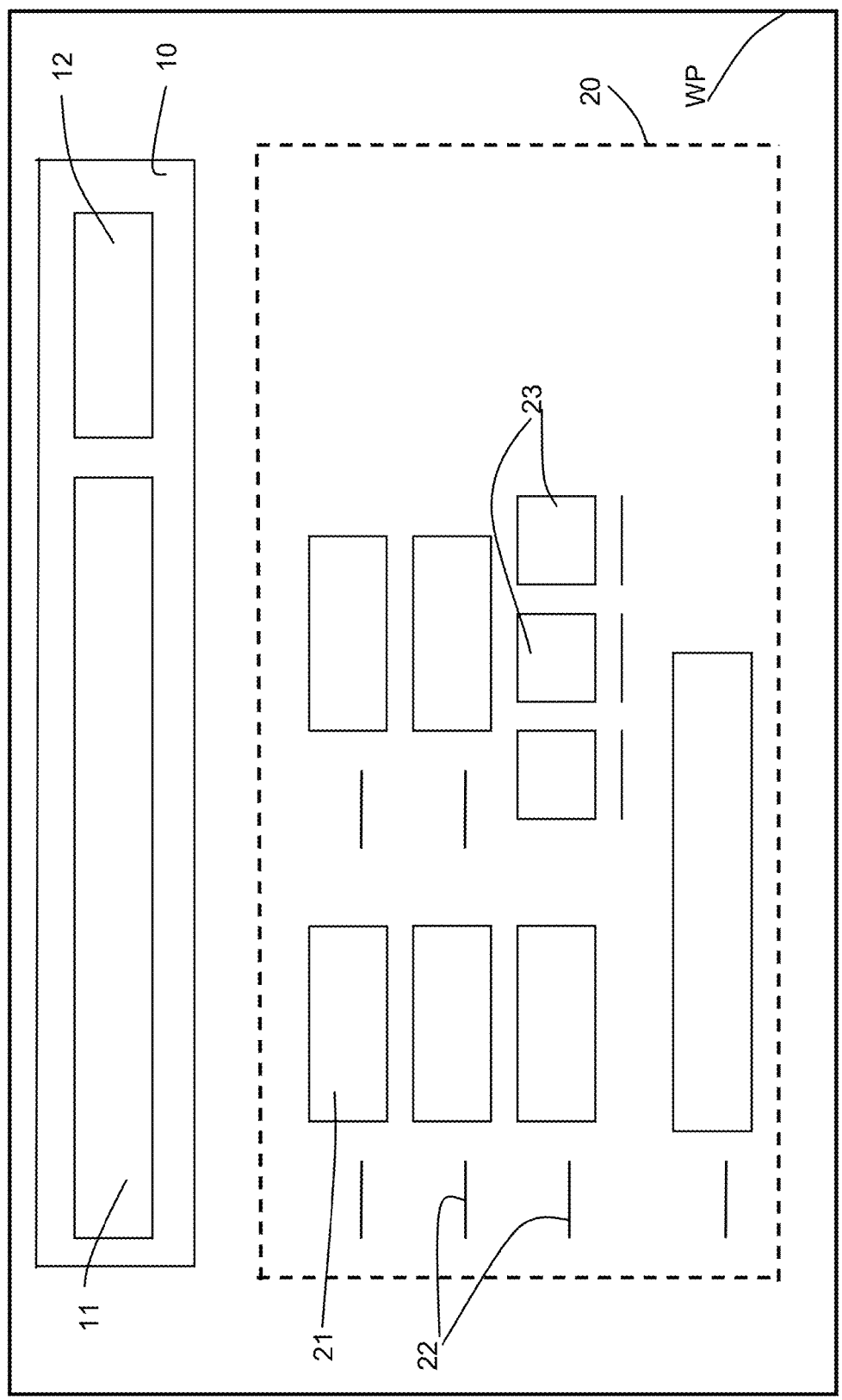
FIG. 1 is a schematic illustration of a GUI as displayed according to the invention.

An example of web page WP is depicted in FIG. 1 in a purely schematic fashion. It comprises a first region corresponding to a first command interface area 10. The first command interface area is for the input of cryptic commands and operates as a command line interface. It comprises a text entry zone 11 for the user's input. It may also include a button 12 (or any adapted GUI component) for selecting the code type of the cryptic commands the operator wishes to use. This renders the invention fully flexible and adaptable to any code type.

The web page WP also comprises a second command interface 20 which is advantageously a HTML (for Hyper Text Mark up Language) form. Any GUI component helpful for building the request can be incorporated in this section. In FIG. 1, text entry zones 21 corresponding to fields are depicted. Field names 22 are located near the Text entry zones 21. Checkboxes 23 are also depicted with their corresponding description.

Examples of fields are Departure and Arrival dates, Origin and Destination airports, number and names of the travellers, connections, booking class . . . .

Optionally the second interface 20 comprises a plurality of tabs to present the various fields in various form portions in a differentiated manner according to the type of data. A first tab may be assigned to Air travel, another to Hotel and so forth.

Figure 2:
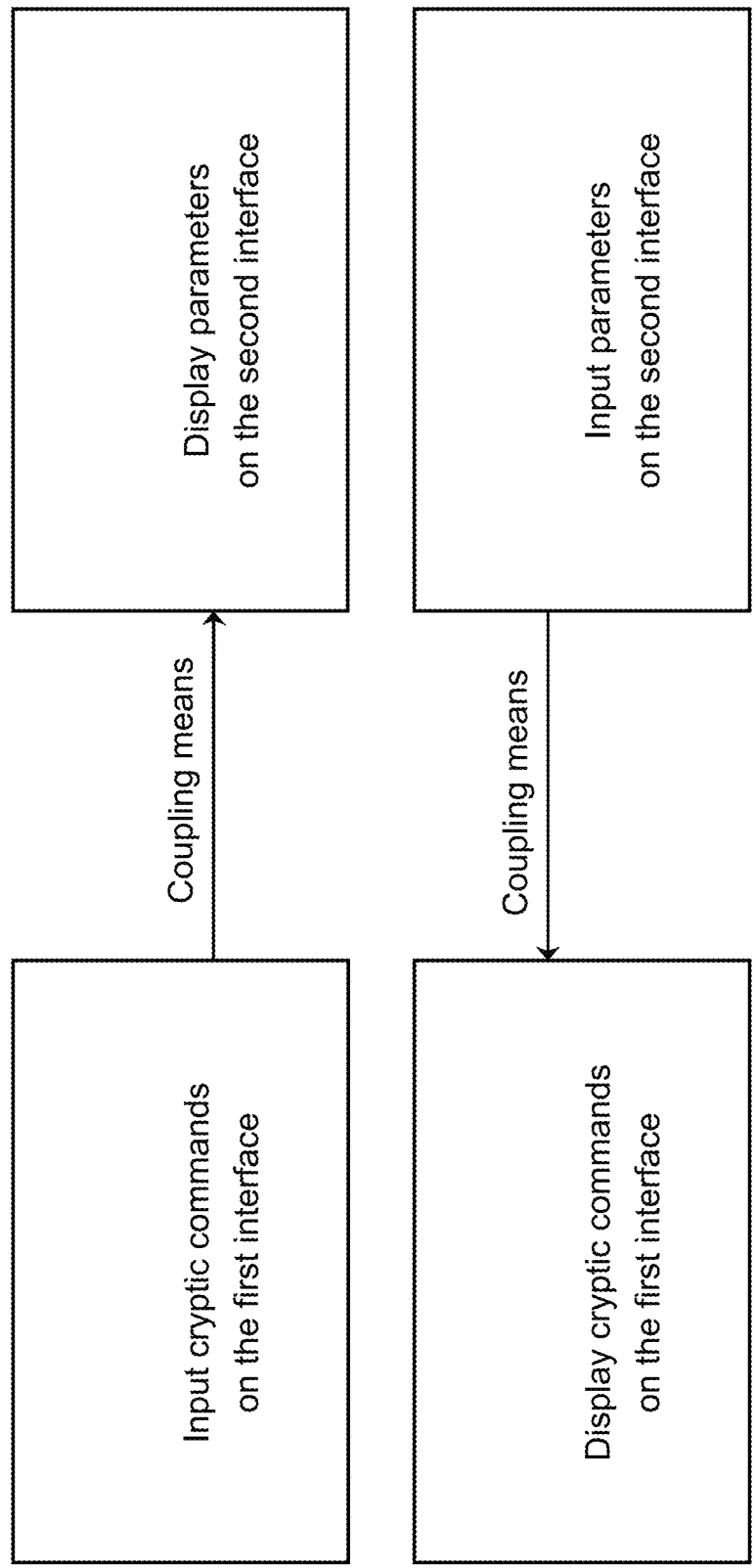
FIGS. 2, 3 and 4 are diagrams describing some aspects of the invention.

In a first aspect of the invention, the input of commands by the first interface 10 dynamically affects the display of the second interface 20. The reverse function is also possible as depicted in FIG. 2. As the user is typing the text in the text entry zone 11, the text is parsed on every key up event. The means for parsing are advantageously JavaScript-based like the rest of the logic used for the coupling means. The invention may be used to interact with a plurality of GDSs and the parsing means are designed accordingly in that case. A single monolithic parser can be utilized or individual parsers (depending on the code type of the cryptic commands) forming a set of parsers. Typically parsers will be implemented per GDS. The parsing of the commands is preferably context sensitive to not only the GDS selected, but also the previous commands and the current context of the page. If the previous command entered and sent to server was an air availability command (e.g. AD12OCTBOSORD8A) a follow up air availability command may be used (e.g. ACR15OCT). The parser will use the previous context of the search to pre-fill the HTML form for air availability. Then only the modified fields of the follow up command will be used. The same principle of context sensitivity applies to "short sell" commands. It is possible to send the cryptic command for short selling a flight on the flight availability page. On other pages, the short sell command for air is not relevant, and therefore will be ignored by the parser(s).

Figure 3:
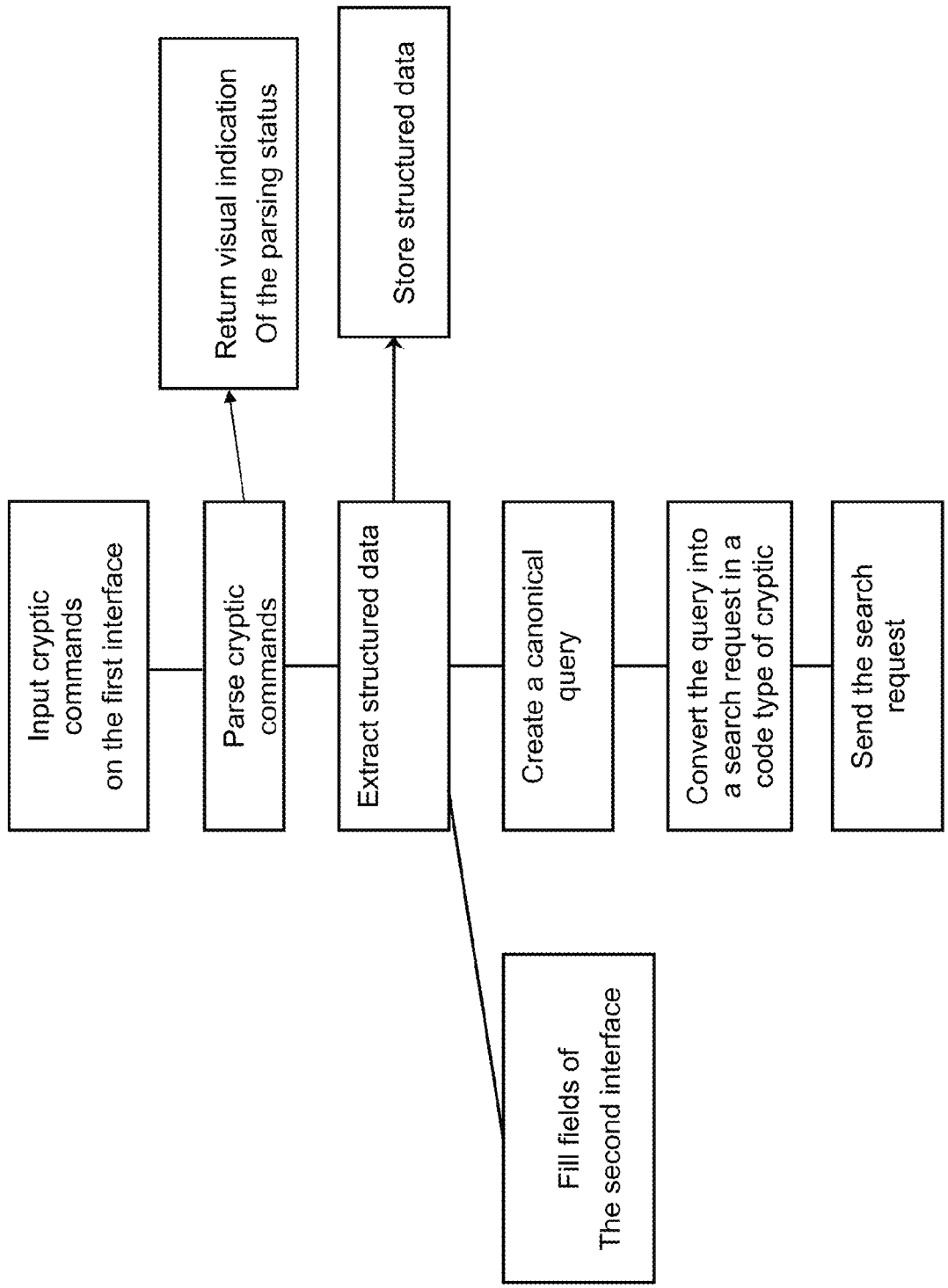

Referring now to FIG. 3, the cryptic commands are also processed to extract structured data. The parsing means may comprise program instructions in this perspective. The structured data extracted by the parser from the command is stored within a JavaScript object. While the parsers are typically very different for different GDSs, the objects representing the commands (e.g. air availability object, hotel availability object) are typically shared between GDSs. That is to say, the object used to store the information from the parsing of a first GDS air availability is the same, or derived from the same base object, as the object used to store the information from the parsing of an air availability command of another GDS. This allows the input of the command in the format of one GDS for eventual submission on any other GDS or non-GDS system.

The objects store several different types of data. The primary functionality is to store the structured data (e.g. dates, times, origin city, etc.) parsed from the cryptic command in a normalized format. In addition, the objects store the raw text input, the tokenized results of the parsing, the GDS assumed for the parsing, any errors encountered during parsing, and other relevant information.

After the parsing and the storing of the information, JavaScript is used to dynamically show the user feedback about the parsing of the commands. The GUI is used to provide a visual indication of the status of the parsing. HTML indicating which parts of the commands were parsed, and which parts of the commands were not parsed is shown to the user. There are several different statuses used internally in the parsing objects that can be conveyed through the user. In addition to a status of success, the following statuses can be conveyed to the user through mouse-over, text styles, and highlighting:

failure to parse (i.e. the parser did not understand the text),
too many repetitions (e.g. the user entered four preferred carriers and the form only supports three),
unsupported (i.e. the parser understands the text, but the HTML form does not support the input or the input) is inappropriate for the web-based environment.

Subsequently, JavaScript is used to update the HTML form fields with the structured data from the data objects. The information updated in the form includes the relevant structured information (e.g. dates, times) as well as hidden information used by the system (e.g. a JSON representation of the parsed cryptic objects.). JSON (short for JavaScript Object Notation) is a lightweight computer data interchange format. It is a text-based, human-readable format for representing simple data structures and associative arrays called objects.

To allow for both cryptic and form based input, HTML forms allowing the types commands sent to the GDS must be available. Typically, this means that on any page that has a cryptic input text box, there will also be forms for air search, car search, hotel search, PNR search, profile search, etc. In addition, the parser will also utilize the forms used for the selection of flights and other "short sell" entries. This form-based input is used for most commands except for the cryptic bypass. The cryptic bypass is discussed as a special case below.

When the user is done entering the cryptic command, it is possible to modify the data sent to the server by modifying the HTML form. Alternatively, they can simply submit the form by pressing enter as they would when sending the GDS a command.

For the purposes of the back end, there is no difference whether the information was entered by the agent in cryptic or via the HTML form directly since the data has been normalized by the parsers. This abstracts the agent's preference for entering in cryptic (or not) from the abilities of the system. Typically, it has been possible to provide more robust features when using a web application with structured HTML inputs as opposed to entering cryptic directly on the GDS.

Returning to FIG. 3, the data extracted as described before are used to create a canonical query, the canonical data model being a design pattern used to communicate between different formats. Instead of writing translators between each format of cryptic commands, it is sufficient to write a unique converter between the canonical format and each format of cryptic command codes.

Figure 4:
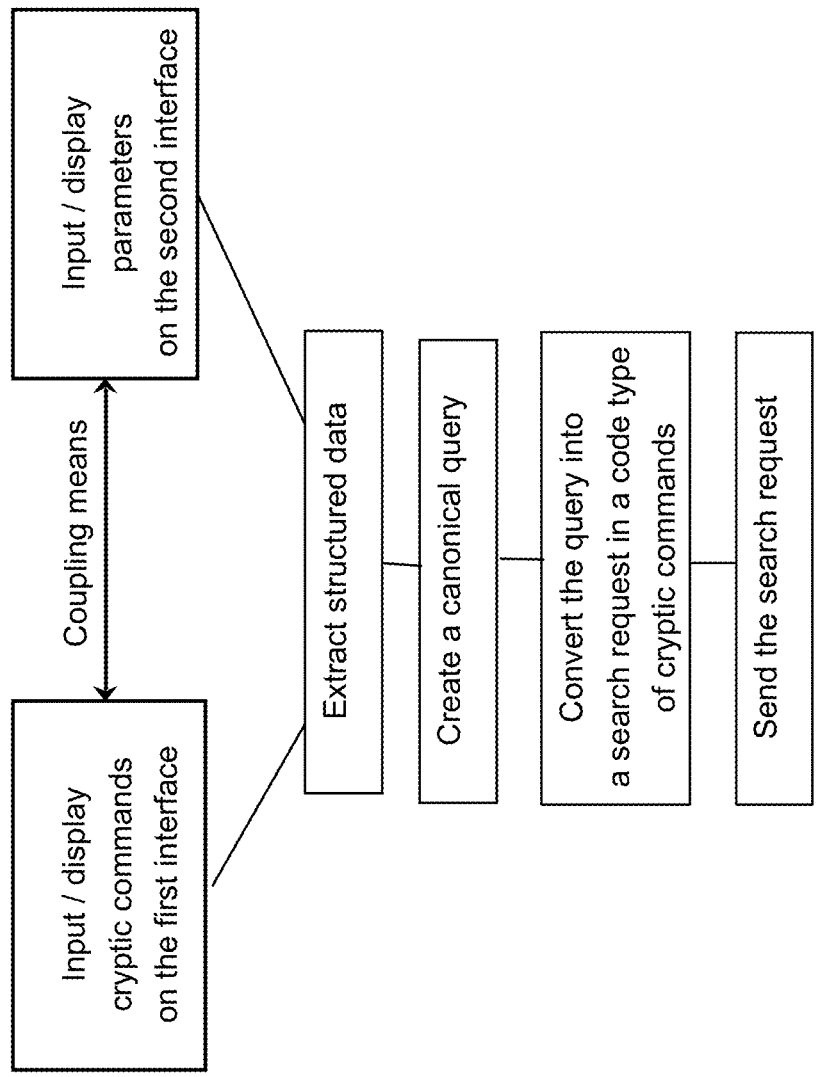

FIG. 4 illustrates that the canonical query is converted in the code type format compatible with the remote system which will process the request. The request is then sent to the GDS or any other device capable of handling with the request.

FIG. 2 more precisely shows that the two interfaces may be used to enter the information required for constructing the search request. The data being formatted as structured data, the two sources of user input are combined and the user benefits from the advantages of the two types of interface.

The present description mainly focuses on the case where data input is made by means of the first interface and where the data are further processed to populate the second interface. However the input may also be made with the second interface and the first interface is populated using a data conversion in the reversed direction but using a similar processing.

Figure 5:
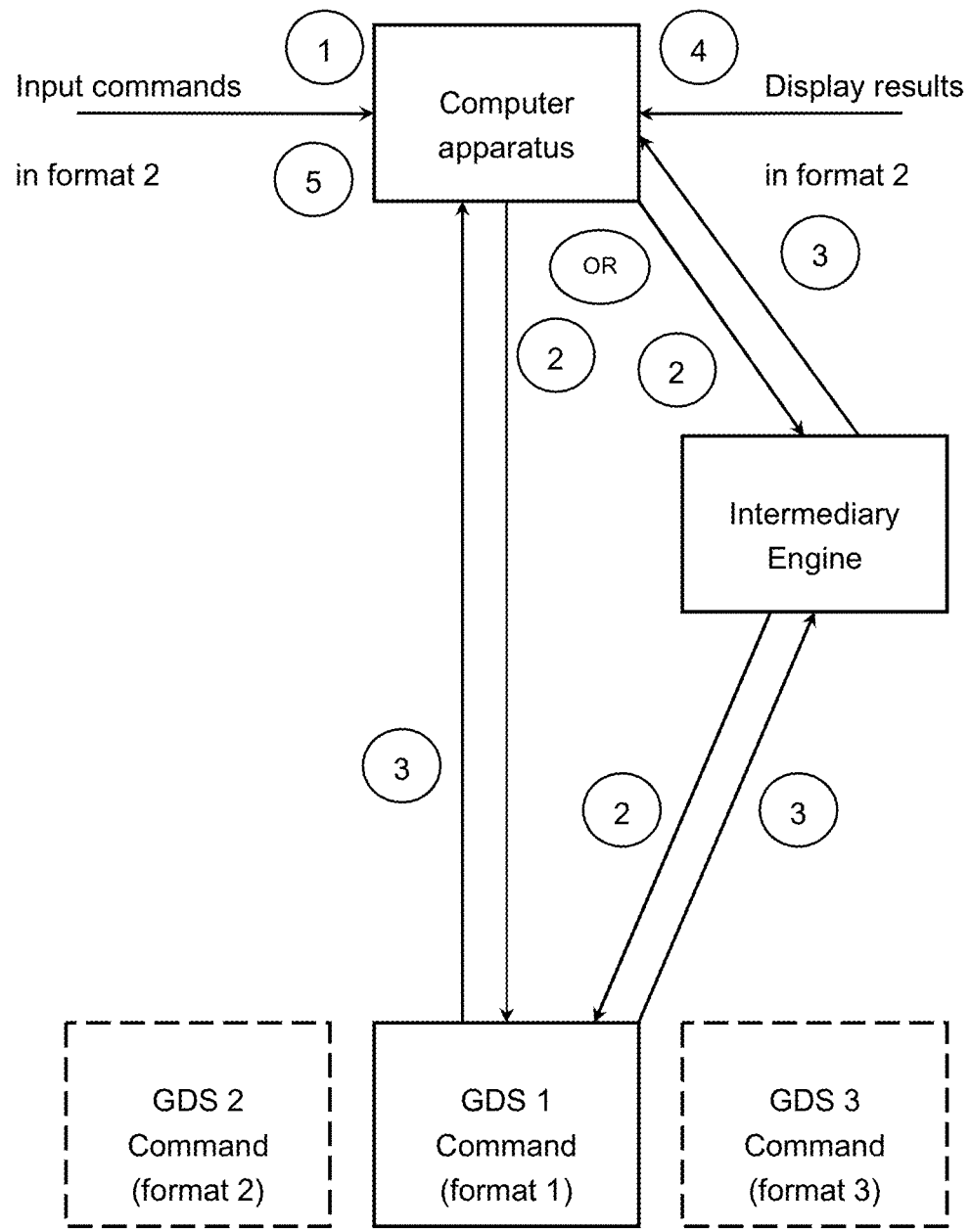
FIG. 5 provides an example of relationships between a computer apparatus and other components of a reservation system.

Turning now to FIG. 5, the relationships between the computer apparatus and the rest of the system is depicted. In a first embodiment the request 2a is directly sent to the GDS computer system. In another embodiment 2b/2c, the request is firstly received at an intermediary engine in charge of applying travel management rules and settings to the request. Instead of manually applying policy to requested travel itineraries, the agent uses this rules engine that can apply policy rules and filter results display 3b/3c automatically. Since the invention allows agents to use the same technology, but keep their comfortable and efficient mode of entry via cryptic command, travel agents can benefit from the automatic profile and rules lookup, too. This saves time for the agent, makes the client call more productive, and improves the agent's ability to accurately represent and comply with the company and agency policies.

FIG. 5 also shows that a request in the format 1 of GDS 1 may be built and sent on the basis of an original input of cryptic commands in another format (format 2) for which the agent is more skilled. The results can also be presented on the display screen with indications given using the format 2.

There are some cases where it is advantageous to send commands directly to the GDS and receive text responses instead of parsing the commands and filling in an HTML form. These cases are handled by the invention as a cryptic bypass. The parsers for the GDS are configured with a command or commands that should be passed directly to the GDS. Additionally, the parsers are configured with commands (bypass code) that should pass directly to the GDS and put the parser in bypass mode. Once in bypass mode, the parser will send all commands (or a configurable, but different subset of commands) through the bypass until the bypass is terminated with a configurable command or commands. Commands that are sent through the bypass mode are done using an AJAX call to the server. The server passes the commands to the GDS and returns the text response. This text response is received by the browser and displayed in a text area for the agent.

FIGS. 6 through 26 show examples of GUI generated with the apparatus and according to the method of the invention.

Figure 6:
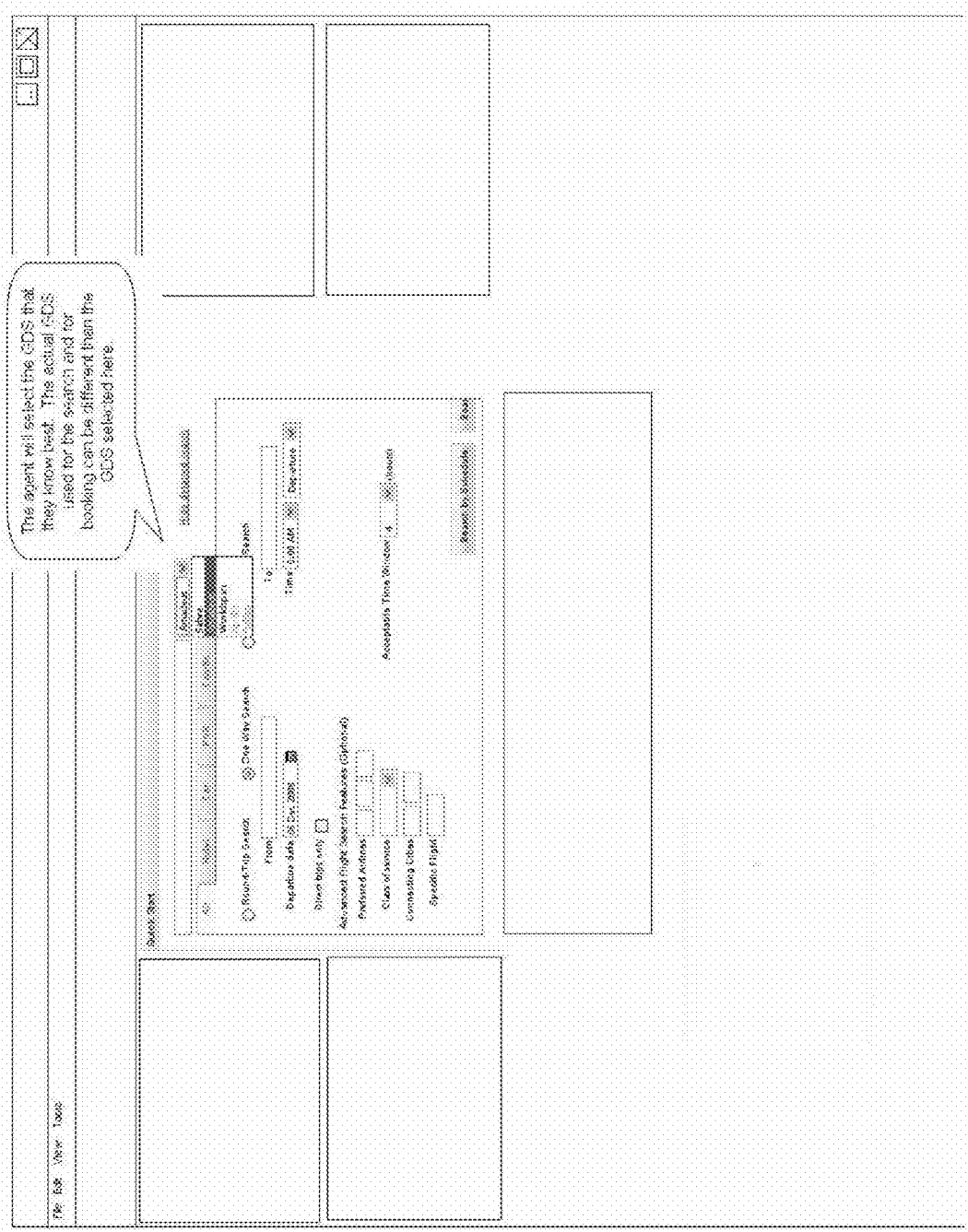

FIG. 6 depicts a web page displayed by a browser for initiating a travel request. In addition to various peripheral information, the window includes a "quick start" region with the two interfaces described before. The user first selects the name of the code type he wants to work with among choices defined by the name of the corresponding GDS. A default code type is preferably defined. The user can now input cryptic commands in the text entry region.

Figure 7:
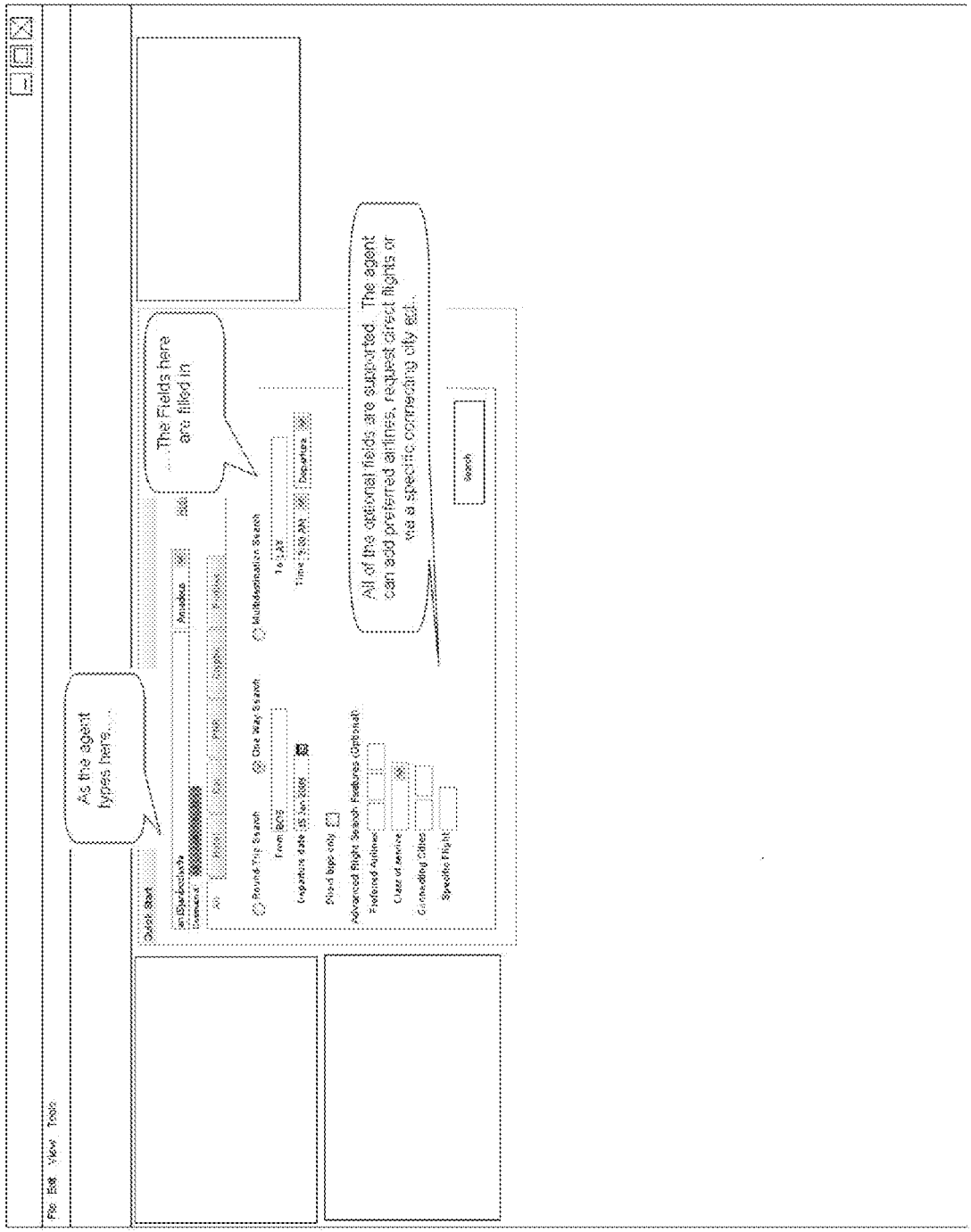

This is illustrated in FIG. 7 in which the typing in the command line is dynamically translated and displayed in the region located under the first interface and corresponding to the form-based interface. The fields of this portion are automatically filled.

Figure 8:
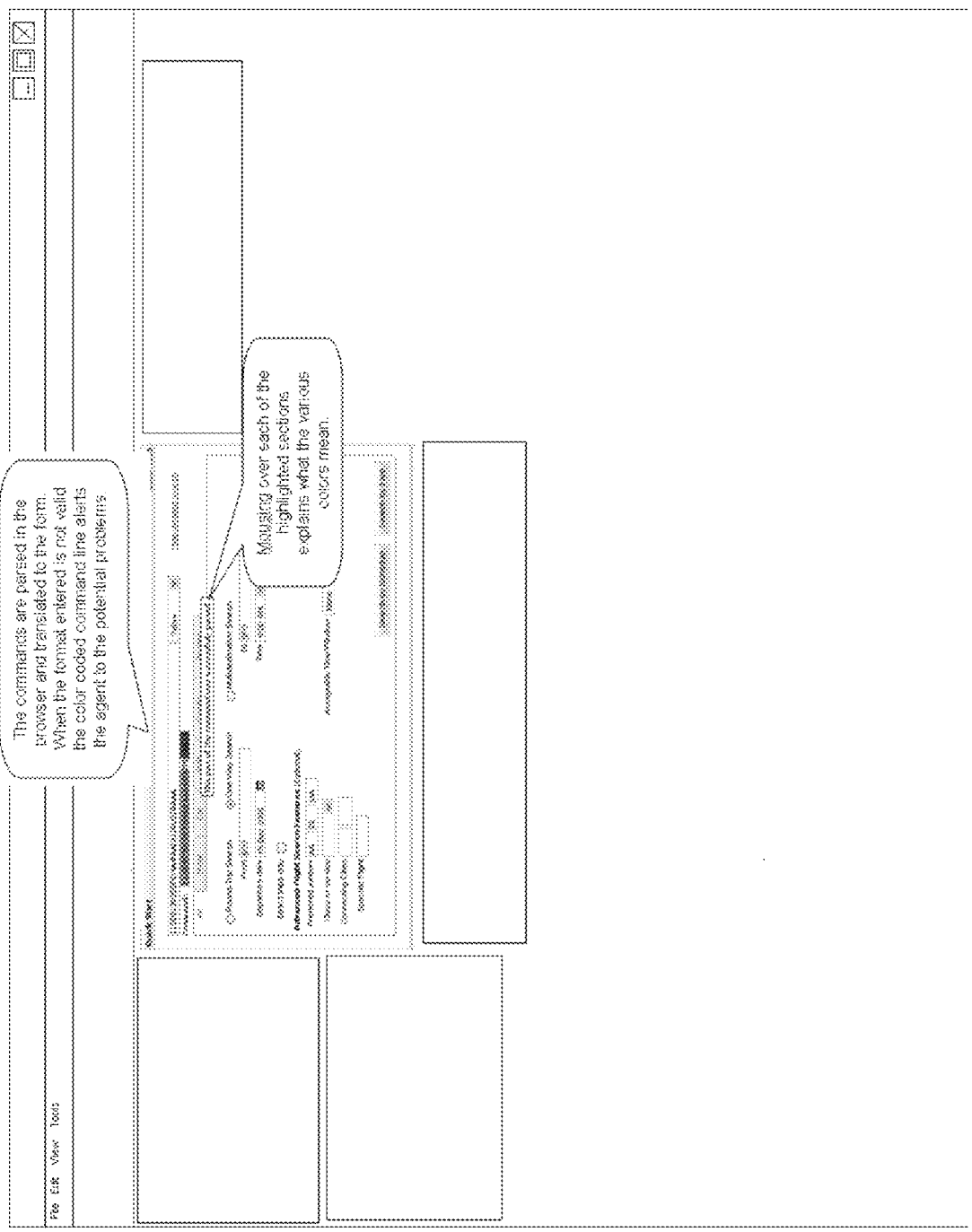
Figure 9:
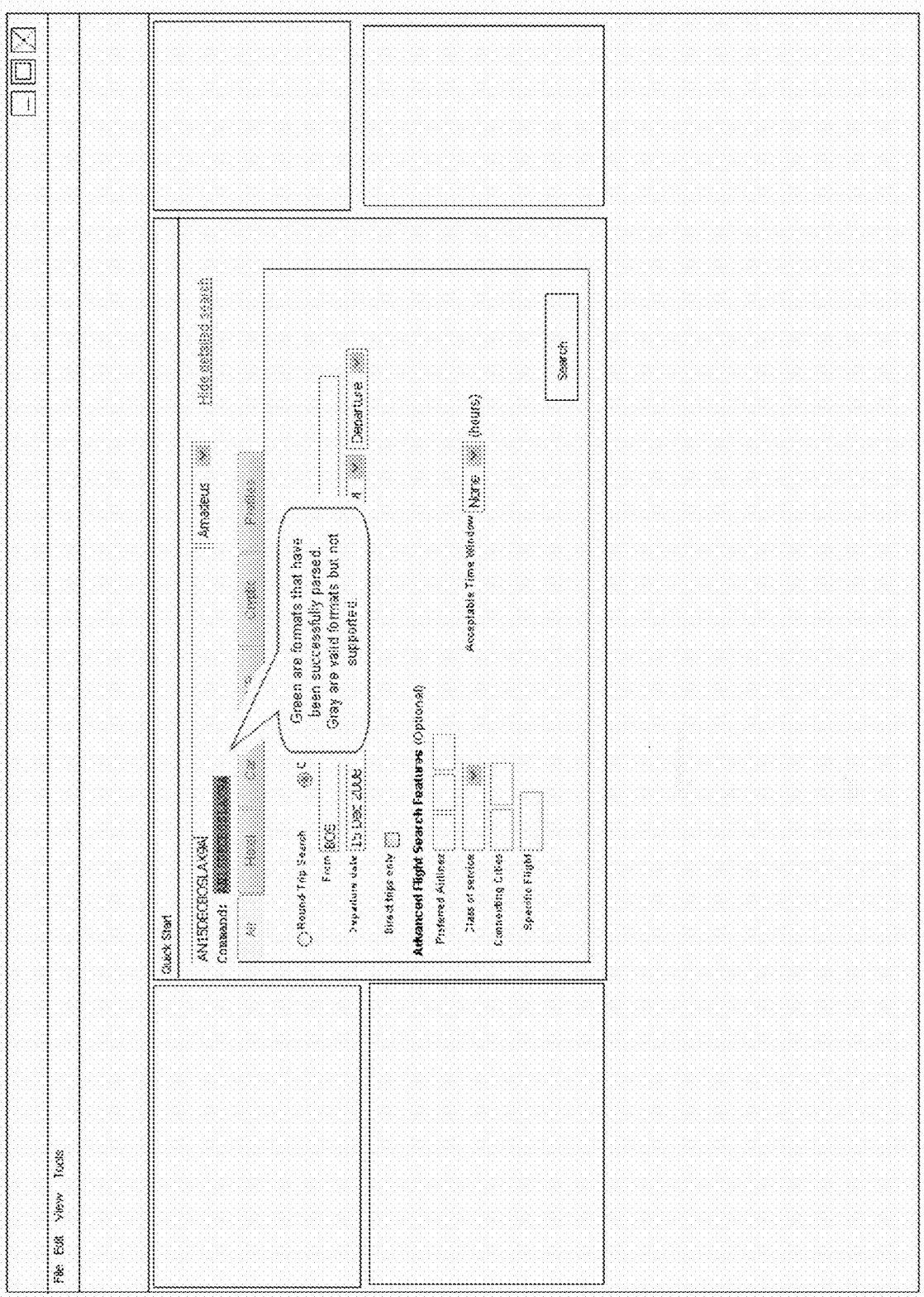
Figure 10:
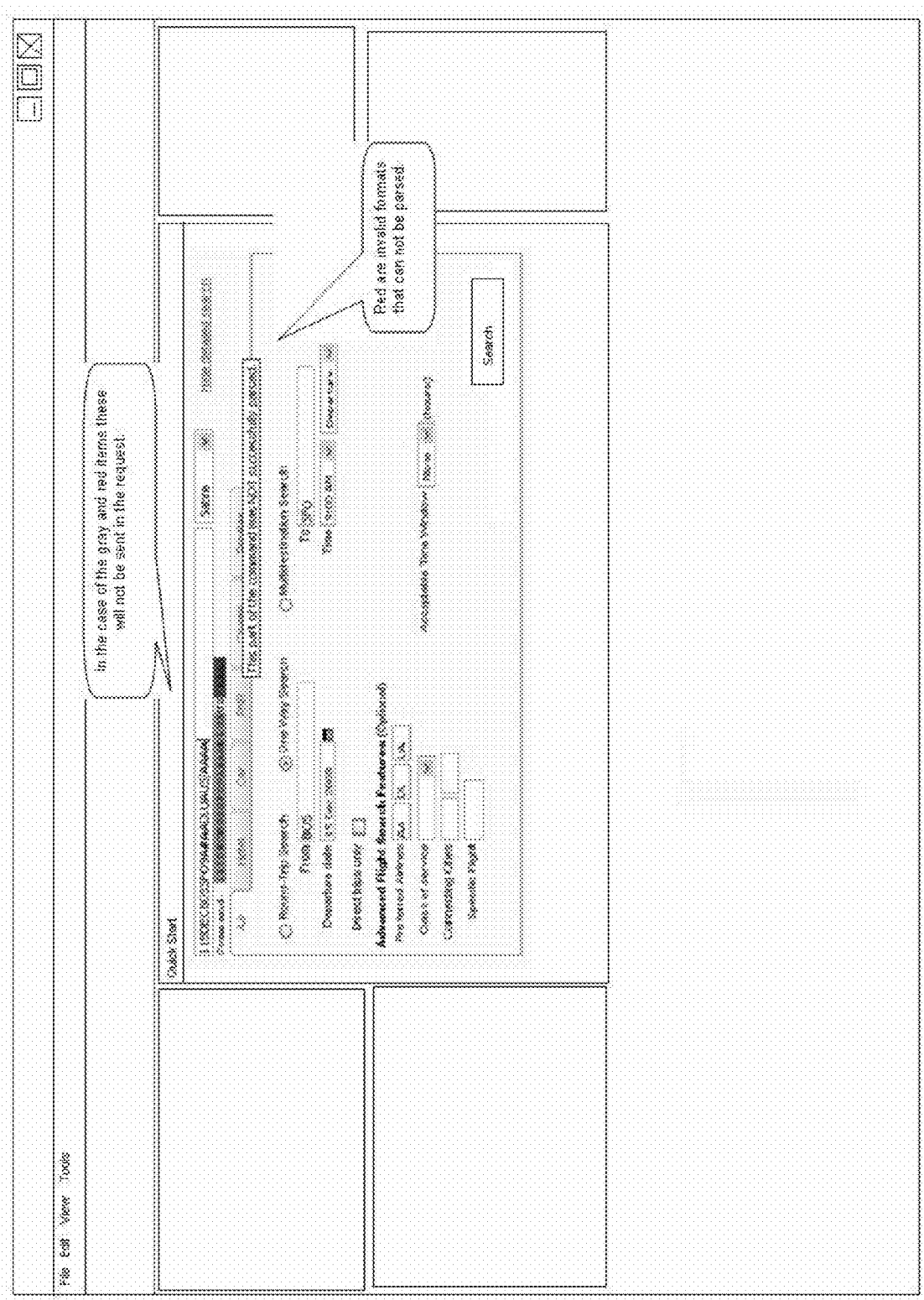

Helping tools are proposed to the agent and a particular one is depicted in FIG. 8 where visual indications about the status of the cryptic commands are given. Indeed the parsing step produces a display about the parsing status notably by assigning a color to the command strings, a color code being predetermined to reflect a particular status. FIGS. 9 and 10 further represent this feature with the following color codes: green for commands successfully parsed, red for commands that cannot be parsed and grey for commands entered in an invalid format.

Figure 11:
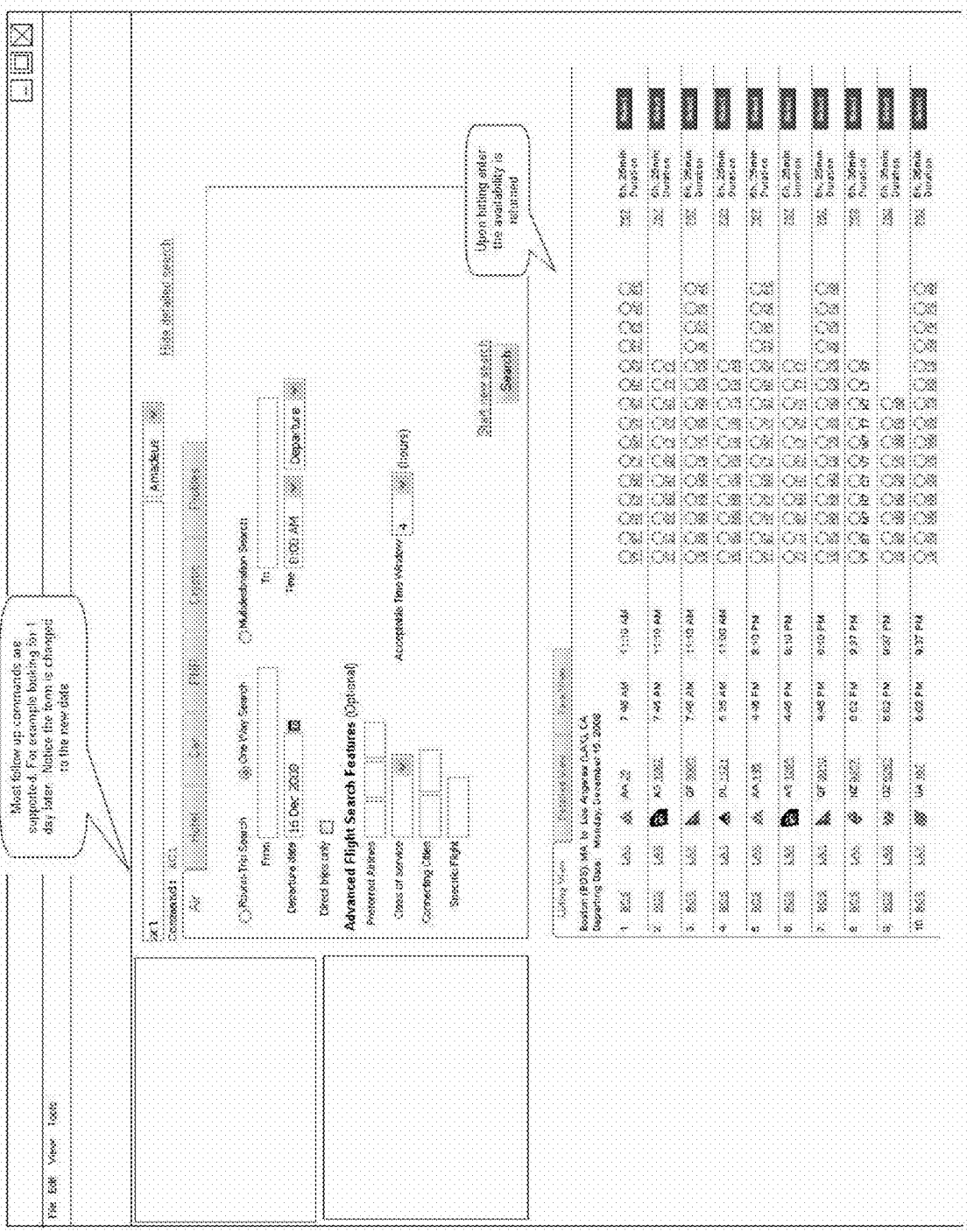
Figure 12:
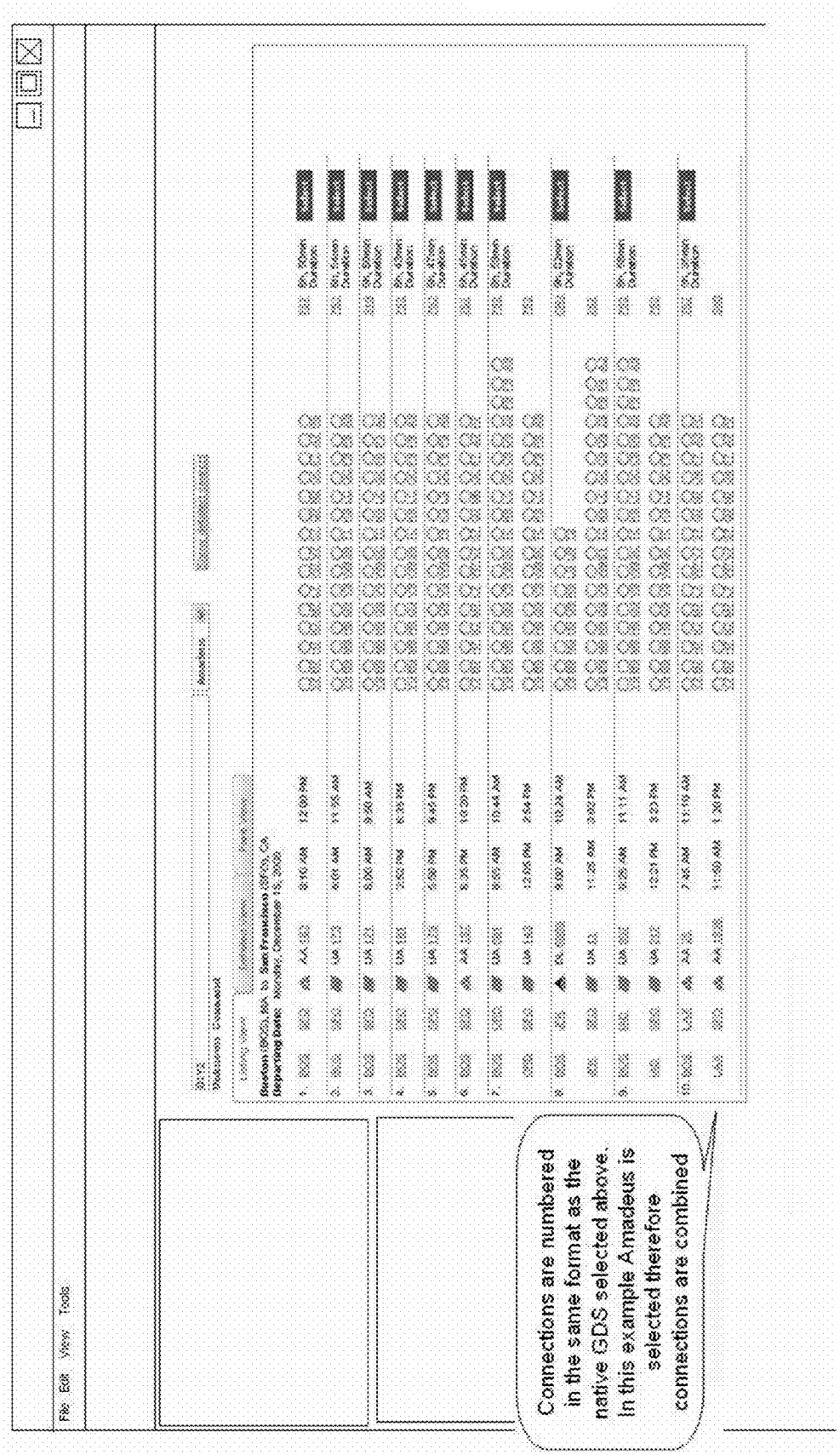
Figure 13:
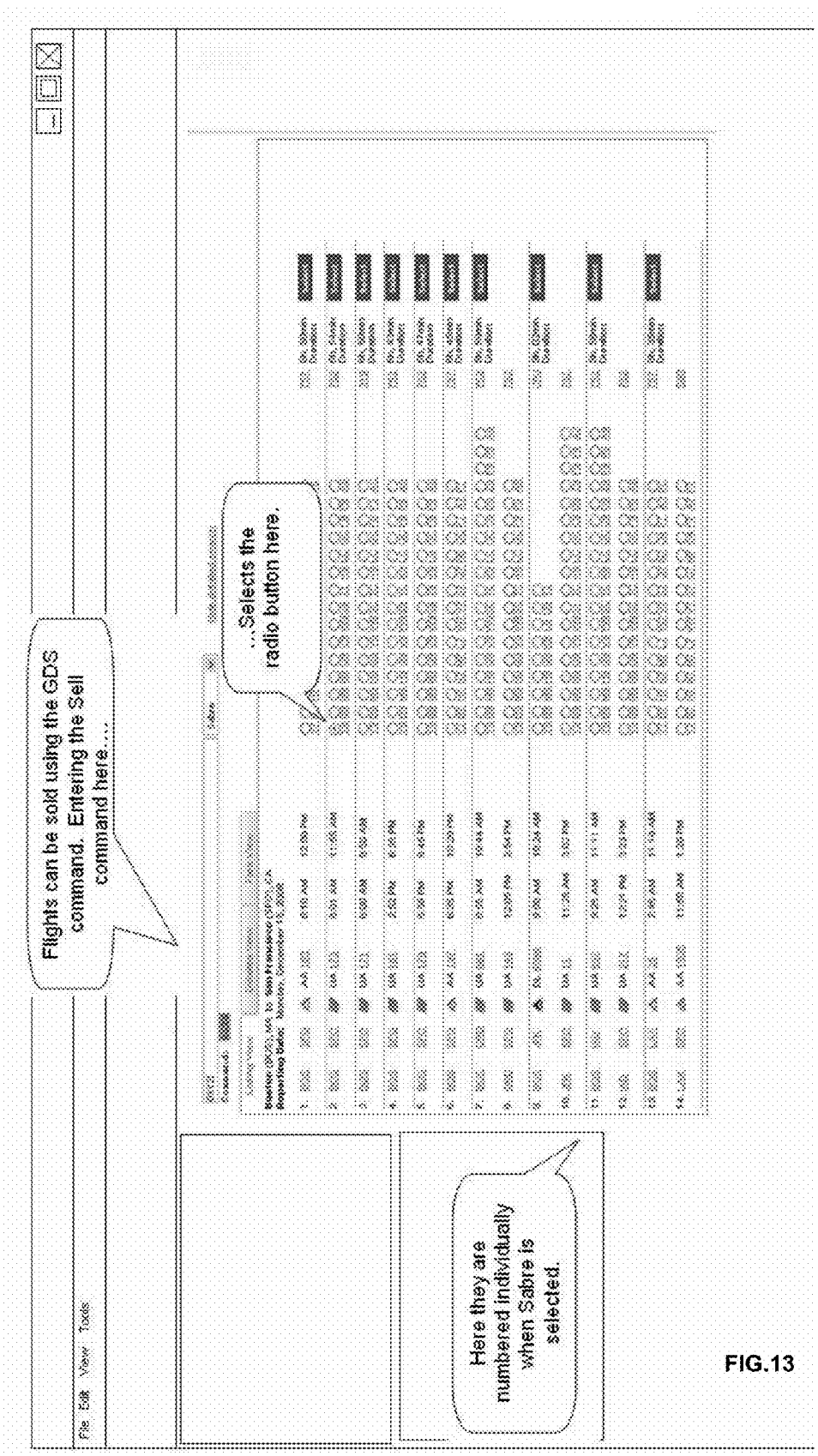

FIGS. 11 to 13 provide with examples of GUI obtained as results are displayed. According to the embodiment of FIG. 11, the results are presented in a list located under the two command interfaces. Alternatively the window of FIG. 12 only displays the first command interface and the list of results. In the later list, codes can be used to describe the fields of each travel solution and they are advantageously in the format used for typing the request.

Figure 14:
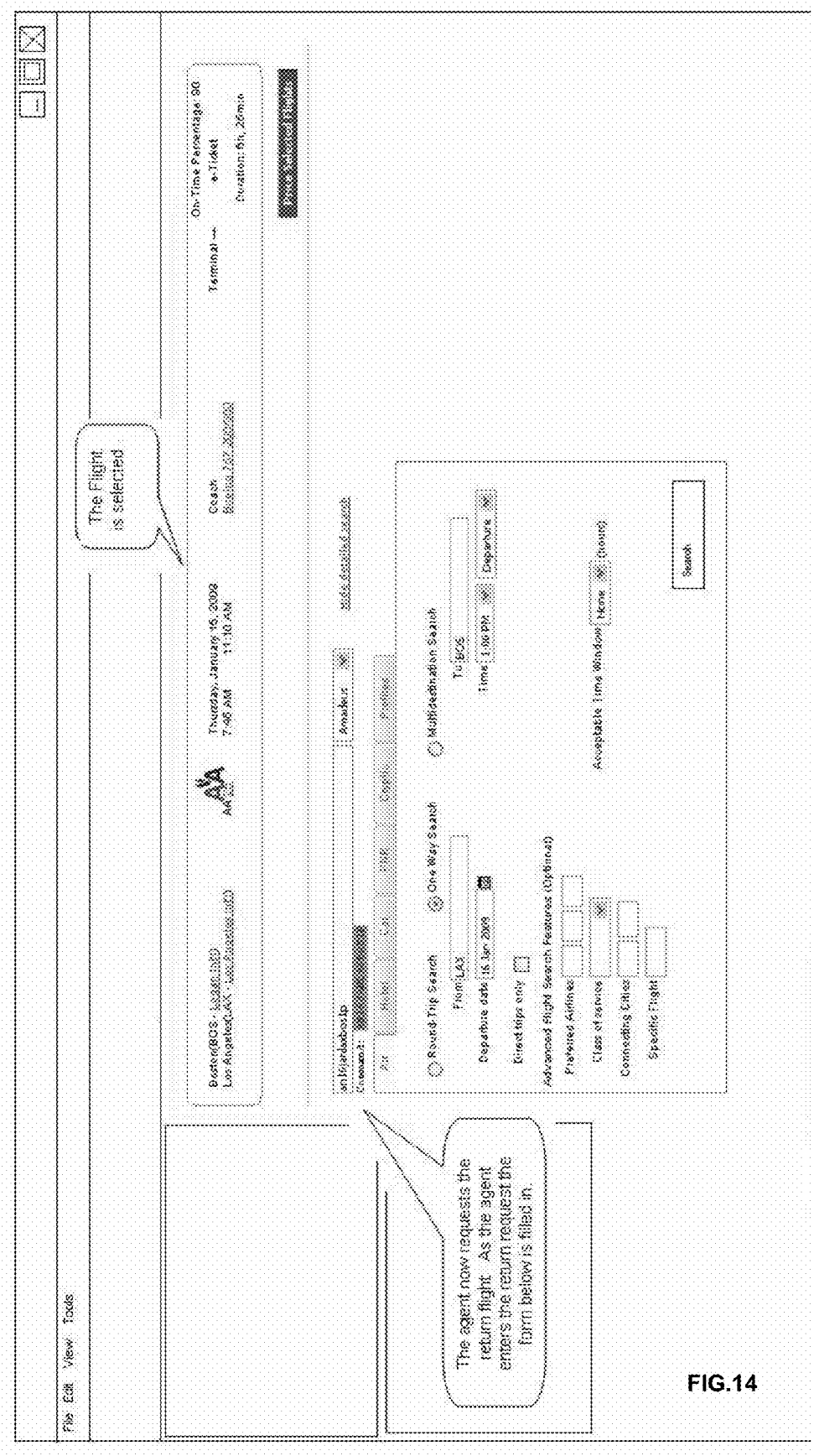
Figure 15:
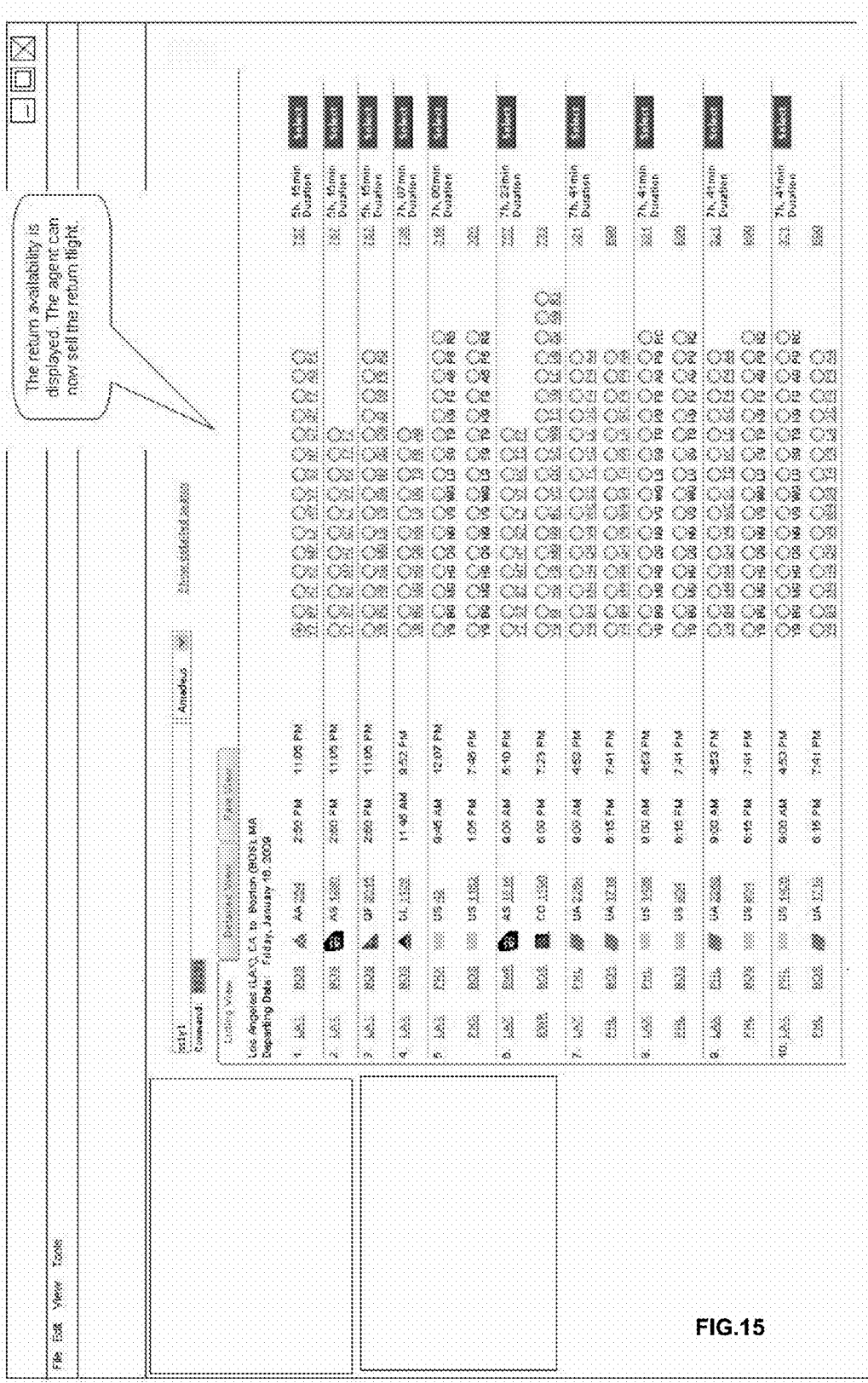
Figure 17:
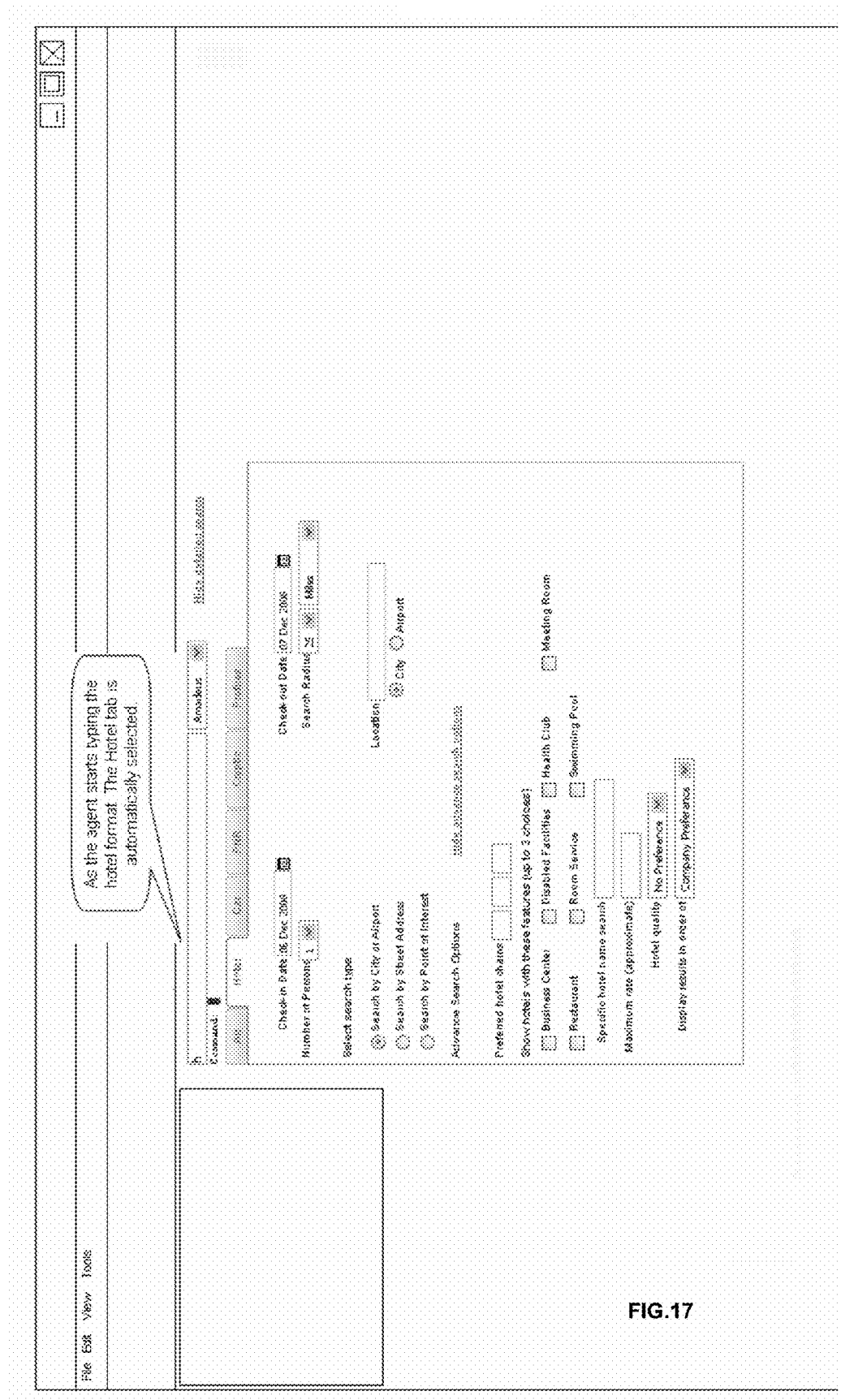
Figure 19:
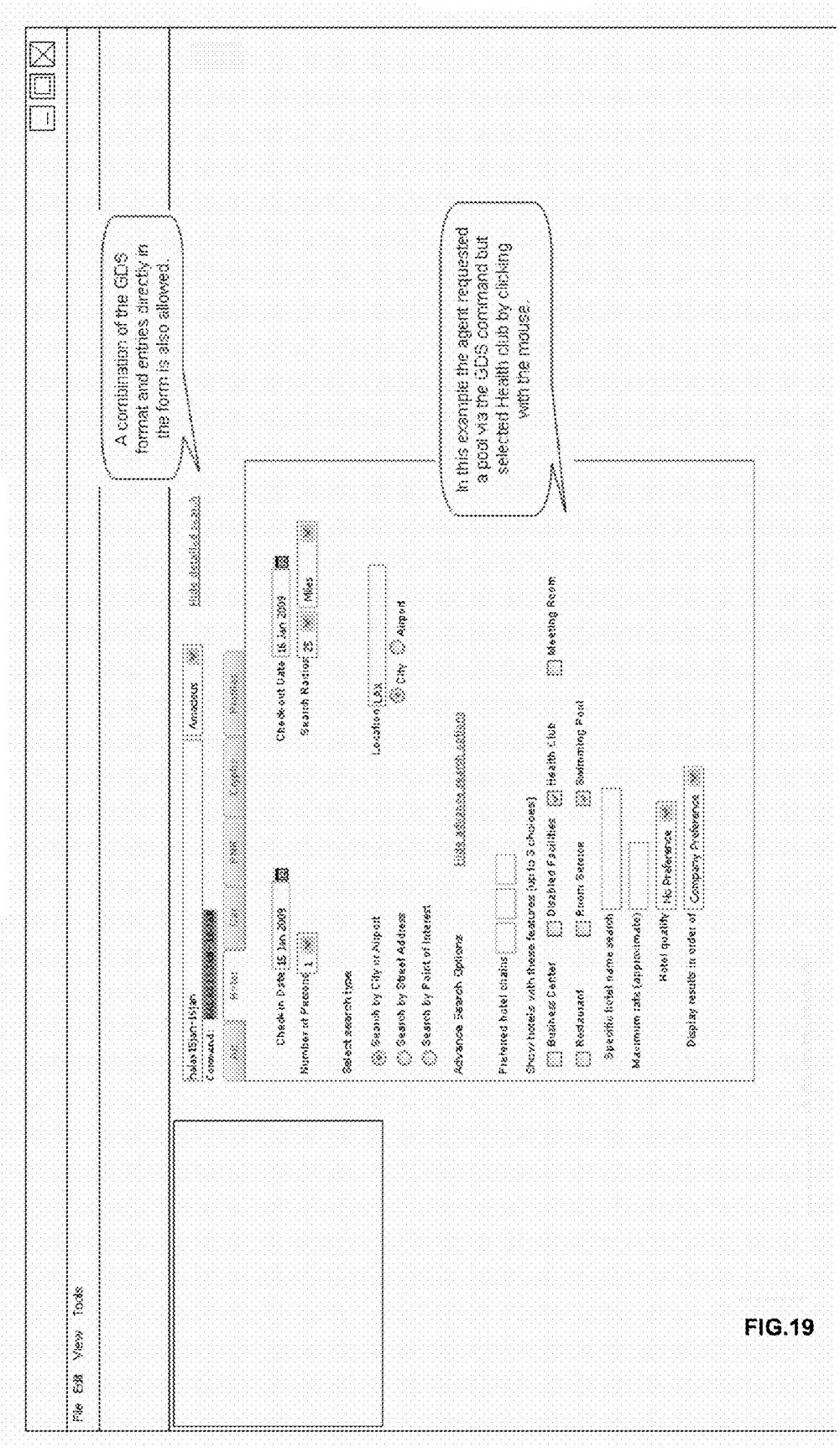
Figure 20:
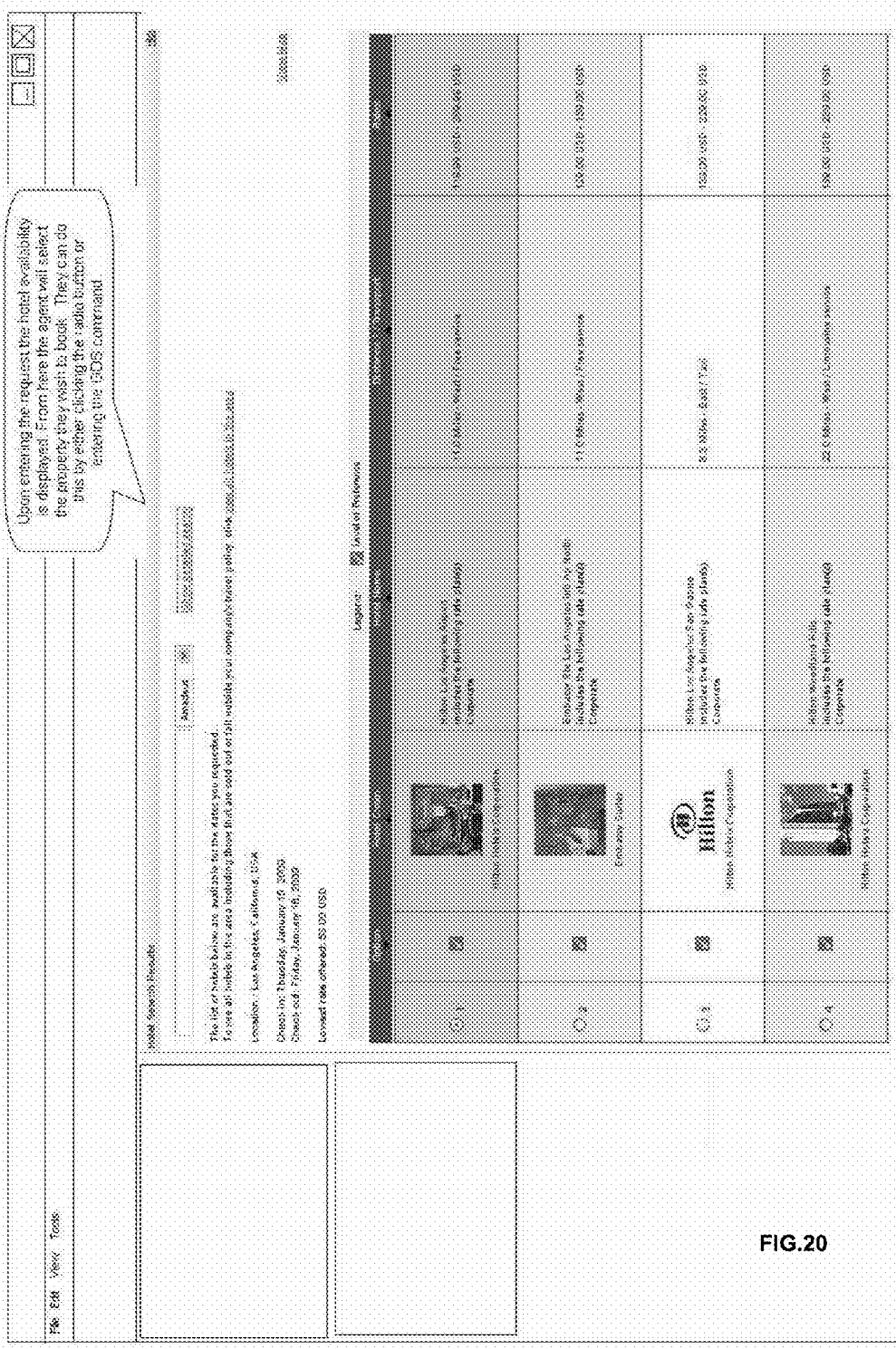
Figure 21:
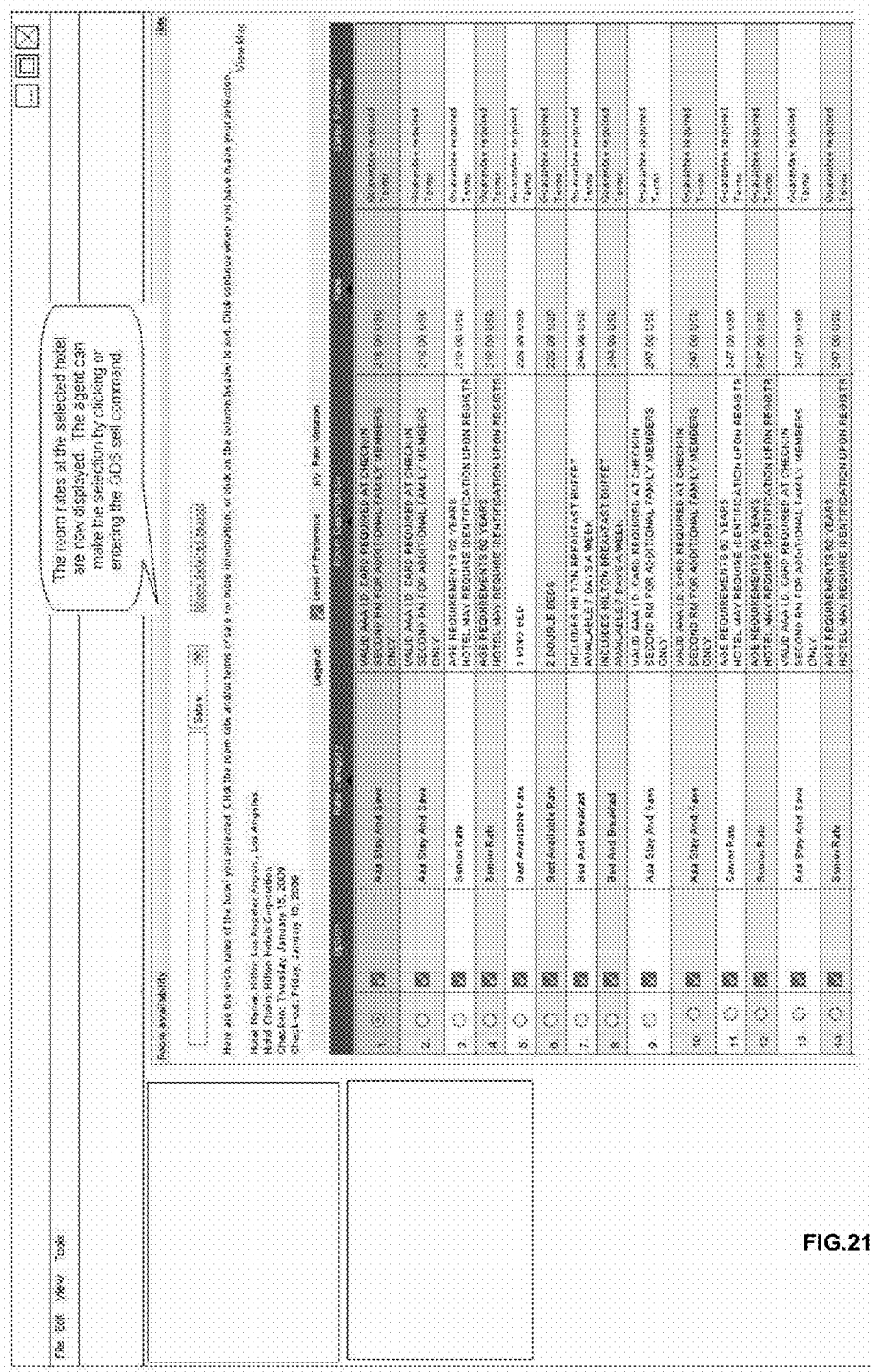

In FIG. 13, further commands on the first interface can be used for selecting a travel solution, refining the request etc. If a travel solution is selected, a window like the one of FIG. 14 is displayed for further steps of the reservation such that entering a request for finding a return flight. Return solutions are then suggested on a further window like in FIG. 15.

Turning now to FIGS. 16 through 21, steps for booking an accommodation are exemplified. The Hotel tab of the second command interface is selected with the mouse or any other pointer or the tab is automatically displayed as the user types the appropriate command in the first command interface (see FIG. 16). In a way similar to the flight request explained above, the user inputs the criteria of the hotel request either via the command line or via the form proposed in the second command interface. This corresponds to FIGS. 17 to 19. Upon validation of the request, the computer apparatus waits for the reply of the remote system and finally obtains the results presented in a further window like in FIG. 20. Again at least one of the command interfaces remains available for further entry like a selection command depicted in FIG. 21.

Figure 22:
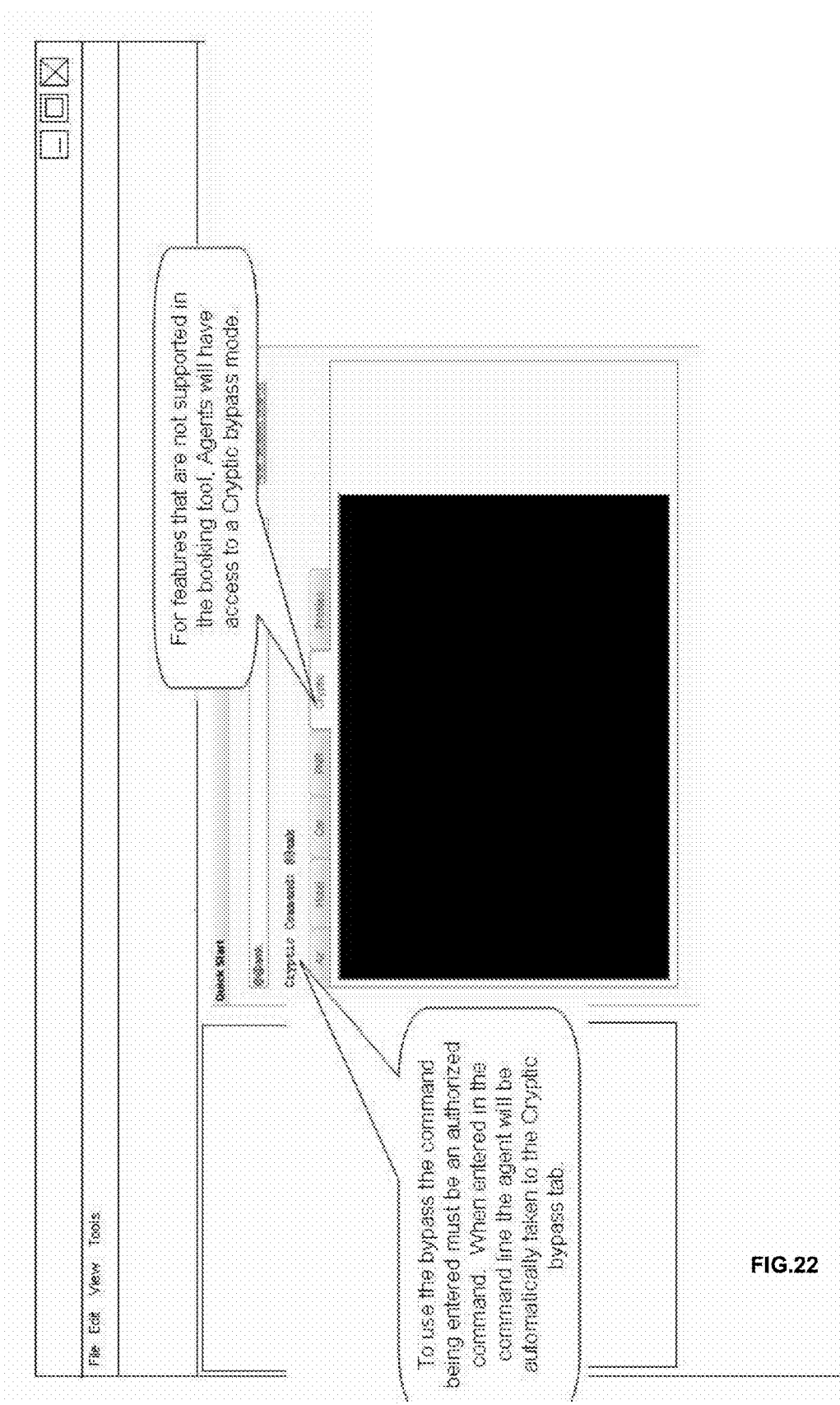
Figure 23:
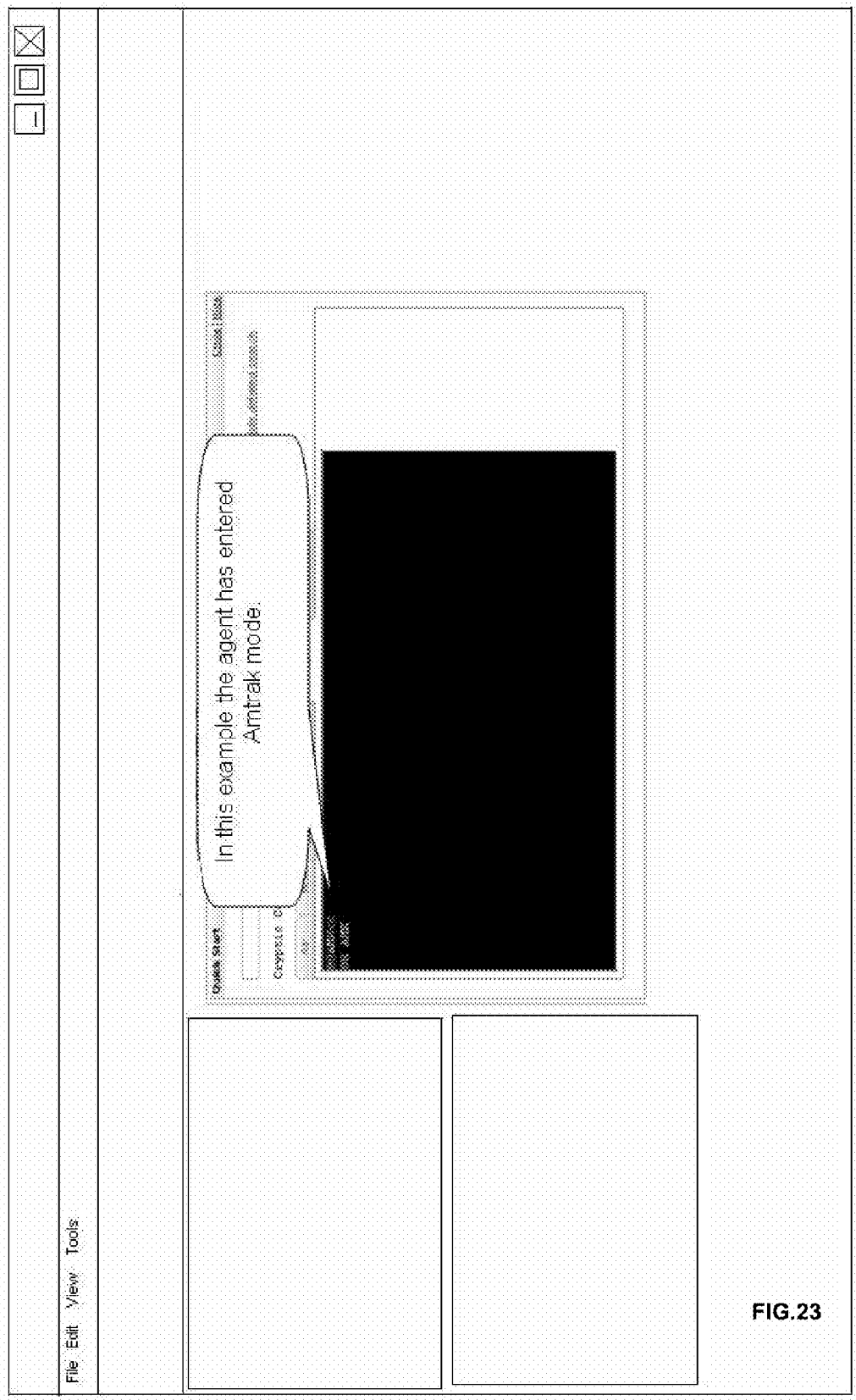
Figure 24:
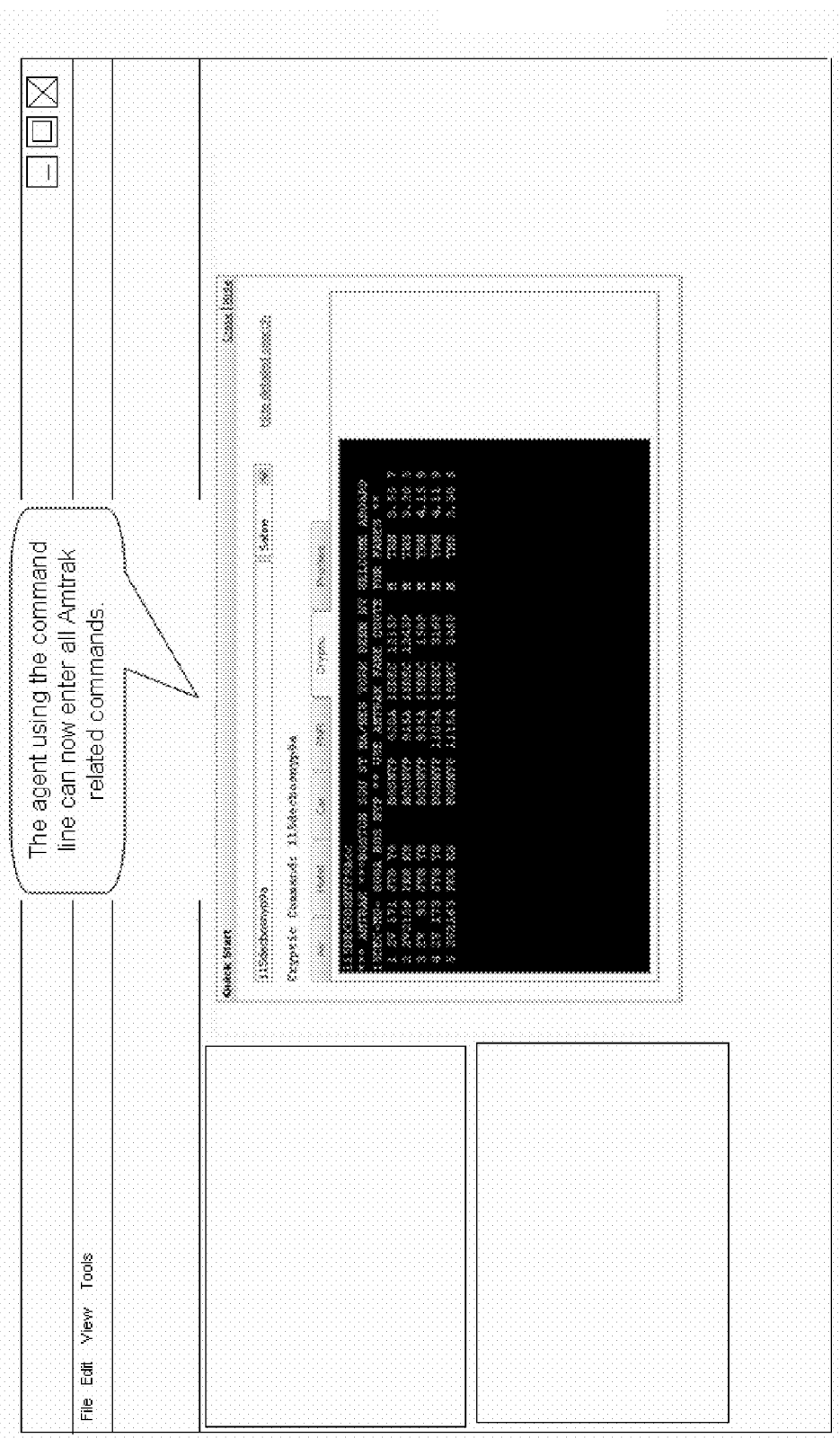
Figure 25:
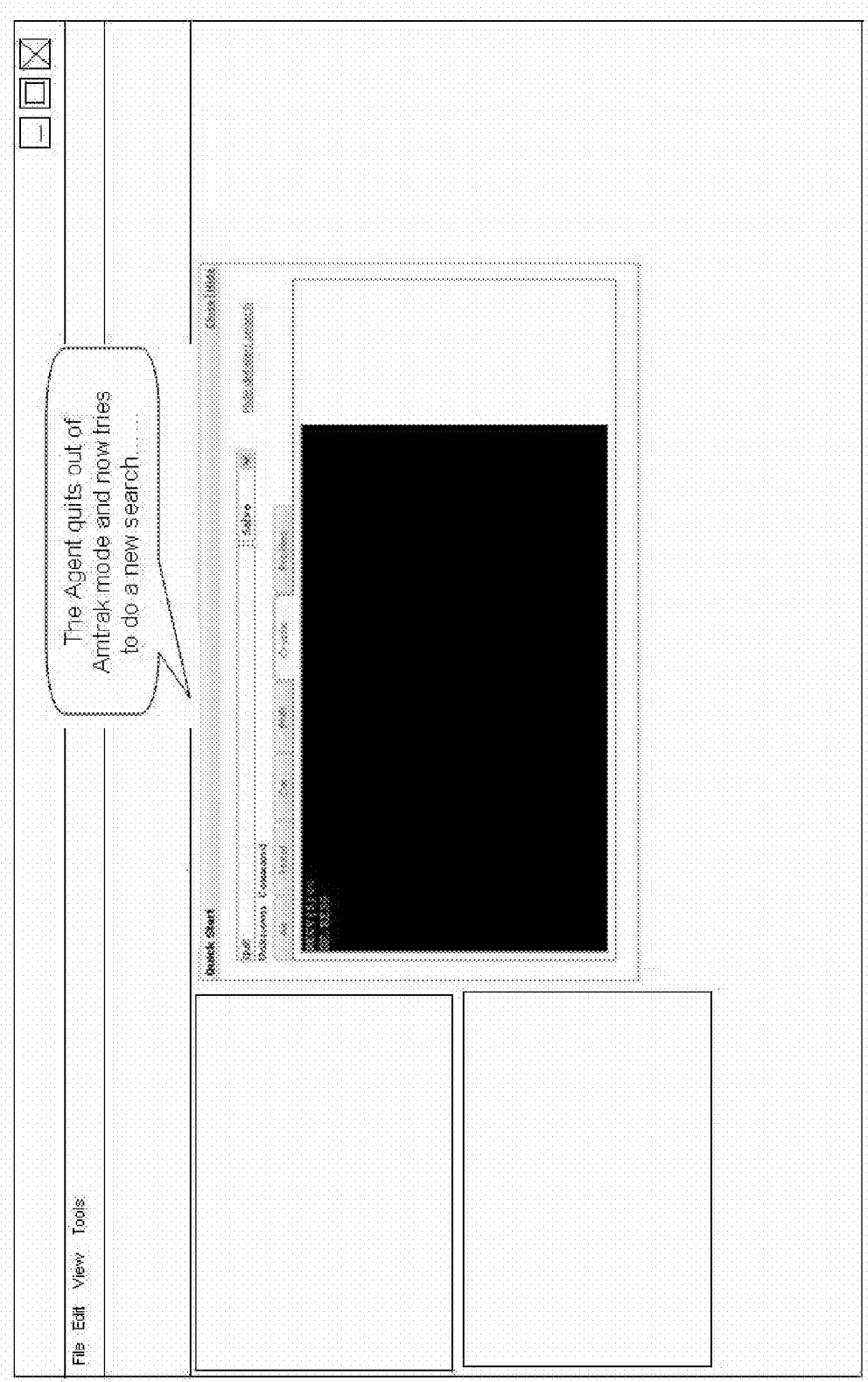
Figure 26:
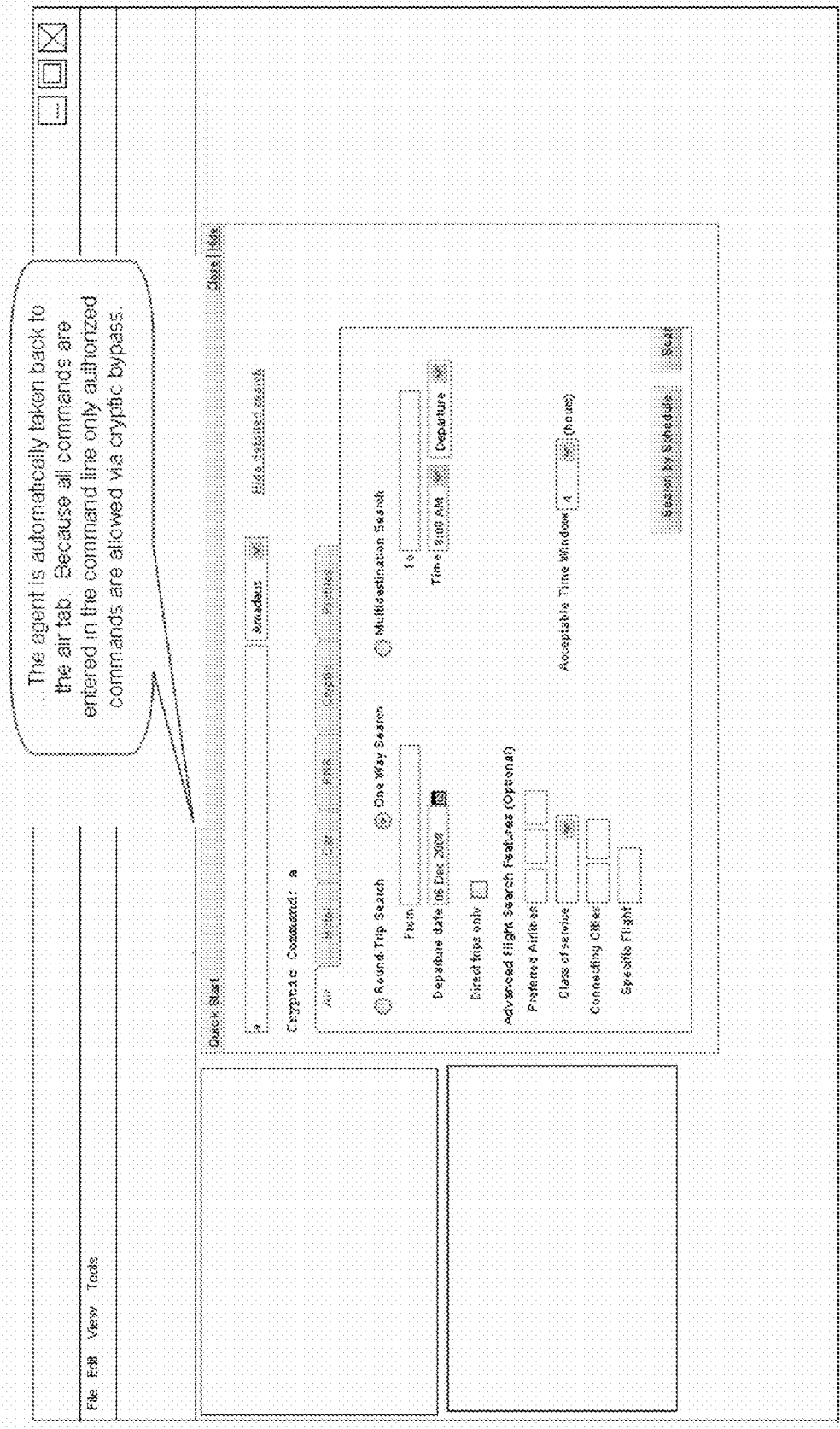

A bypass mode enables the agent to use an alternative operating mode for cases not supported by the previously described interfaces. Upon typing a bypass command in the first command interface, a dedicated tab is open in lieu of the form-based interface as illustrated in FIG. 22. Further inputs can be done by the agent with a display in this tab as given in the examples of FIGS. 23 and 24. A quit command in FIG. 25 closes the tab which is replaced by the original GUI window of FIG. 26.

Although consisting of preferred embodiments, the examples illustrated by the various figures do not intend to limit the scope of the invention.

The term of travel agent used within the description is only given as an example of potential user. Also reservations of flights and hotel rooms are purely indicative.

The invention claimed is:

1. A computer apparatus for managing a search request comprised of a plurality of request parameters, the computer apparatus comprising:
 a processor; a display screen; and
 a first graphical user interface including:
  a command line interface area and a form-based command interface area including a plurality of text fields,
  the command line interface area including a control configured to select one of a plurality of cryptic code types, each of the cryptic code types comprising a plurality of cryptic commands compatible with a search request format of a different remote search engine, and the command line interface area configured for inputting and displaying a string of the cryptic commands representing the request parameters; and a translator coupling the command line interface area and the form-based command interface area, the translator comprising a computer program product including instructions executed by the processor for translating the string of the cryptic commands received in the selected cryptic code type into structured data representing the request parameters in response to receiving the cryptic commands input into the command line interface area, and pseudo-simultaneously displaying one or more of the request parameters in at least one of the text fields of the form-based command interface area by populating the at least one of the text fields with the structured data as the cryptic commands are input into the command line interface area, wherein the processor is configured to present the command line interface area and the form-based command interface area on the display screen.

2. The computer apparatus of claim 1, wherein the form-based command interface area is configured to allow for the input of additional request parameters of the search request, and the pseudo-simultaneous display of the cryptic commands reflects at least some of the additional request parameters.

3. The computer apparatus of claim 1, wherein at least the form-based command interface area is embedded in a Hyper Text Mark-up Language page.

4. The computer apparatus of claim 1, further comprising:
computer-executable instructions for generating a visual indication of a parsing status of the cryptic commands on the display screen.

5. The computer apparatus of claim 1, wherein the graphical user interface is a web page generated by a web application.

6. The computer apparatus of claim 1, wherein the graphical user interface is configured to generate a query from the structured data and send the query to a remote search engine, and further comprising:
a second graphical user interface comprising an area for displaying a list of results received from the remote search engine in reply to the query.

7. The computer apparatus of claim 6, wherein the second graphical user interface comprises another form-based interface command area.

8. The computer apparatus of claim 6, wherein the list of results comprises travel solutions with fields codes of the selected cryptic command type.

9. The computer apparatus of claim 1, further comprising:
computer-executable instructions to extract the structured data from the string of the cryptic commands and to store the structured data within JavaScript objects.

10. The computer apparatus of claim 1, further comprising:
computer-executable instructions to create a query in a canonical format on the basis of the extracted structured data and program instructions for converting the query to a further search request.

11. The computer apparatus of claim 1, further comprising:
computer-executable instructions to parse the cryptic commands of one of the cryptic code types.

12. The computer apparatus of claim 1, wherein the plurality of cryptic code types includes a first cryptic code type of a first search engine at a first Global Distribution System and a second cryptic code type of a second search engine at a second Global Distribution System.

13. The computer apparatus of claim 1, wherein the computer-executable instructions comprise JavaScript.

14. A method for managing a search request comprised of a plurality of request parameters, the method comprising:
in a first area of a display screen, displaying a command line interface of a graphical user interface;
selecting one of a plurality of cryptic code types with a control, each of the cryptic code types comprising a plurality of cryptic commands compatible with a search request format of a different remote search engine;
receiving into the command line interface a text string of the cryptic commands in the selected cryptic code type and representing the request parameters;
in a second area of the display screen, displaying a form-based command interface of the graphical user interface that includes a plurality of text fields;
in response to receiving the string of the cryptic commands into the command line interface, translating the string of the cryptic commands into structured data representing the request parameters; and
pseudo-simultaneously displaying one or more of the request parameters in at least one of the text fields of the form-based command interface by populating the at least one of the text fields with the structured data as the cryptic commands are input into the command line interface area.

15. The method of claim 14, wherein pseudo-simultaneously displaying one or more of the request parameters in at least one of the text fields of the form-based command interface comprises:
extracting the structured data from the cryptic commands; and
storing the structured data within JavaScript objects.

16. The method of claim 15, wherein pseudo-simultaneously displaying one or more of the request parameters in at least one of the text fields of the form-based command interface further comprises:
filling the text fields of the form-based command interface by mapping the structured data from the JavaScript objects into the fields of the form-based command interface.

17. The method of claim 14, further comprising:
modifying the structured data in at least one of the text fields using the form-based command interface.

18. A computer program product comprising a non-transitory, computer readable medium having recorded thereon computer executable instructions for causing a computer to operate the method of claim 14.

19. The method of claim 14, wherein pseudo-simultaneously displaying one or more of the request parameters in at least one of the text fields of the form-based command interface comprises:
filling the text fields of the form-based command interface by mapping the structured data into the text fields of the form-based command interface.

20. The method of claim 14 comprising:
sending a query representing the search request to a remote search engine.

21. The method of claim 20, wherein the search request is a search request, an availability request, or a booking request for a travel product, and the remote search engine is part of a computerized travel reservation system.

22. The method of claim 20, wherein the query is first communicated to an intermediary engine for application of travel policy rules to the search request and then sent to the remote search engine.

23. The method of claim 20, further comprising:
defining a bypass code; and
sending the cryptic commands in a query to the remote search engine without extracting structured data each time the bypass code is detected in the cryptic commands received into the command line interface.

24. The method of claim 14, wherein a translator is configured to translate the string of the cryptic commands into the structured data representing the request parameters, the translator includes a plurality of parsers each dedicated to one of the cryptic code types, and translating the string of the cryptic commands into the structured data representing the request parameters comprises:
applying one of the parsers dedicated to the first cryptic code type to parse the string of the cryptic commands to form parsed cryptic commands; and
extracting the structured data from the parsed cryptic commands.

25. The method of claim 14, wherein the cryptic code type that is selected is a first cryptic code type, and further comprising:
creating a query in a canonical format from the extracted cryptic commands;
converting data of the query from the canonical format to cryptic commands of a second cryptic code type different from the cryptic commands of the first cryptic code type; and
communicating the converted data over a network to a remote search engine.

26. The method of claim 14, wherein the cryptic code type that is selected is a first cryptic code type, and further comprising:
creating a query in a canonical format from the extracted cryptic commands;
converting the query into data in the first cryptic code type; and
communicating the converted data over a network to a remote search engine.

27. The method of claim 14, wherein the plurality of cryptic code types includes a first cryptic code type of a first search engine of a first Global Distribution System and a second cryptic code type of a second search engine of a second Global Distribution System.

28. The method of claim 20, wherein the text string of the cryptic commands received into the command line interface is in the first code type of a first remote search engine, and the search request is sent to the remote search engine in a second code type of a second remote search engine that is different from the first code type.

29. The method of claim 20, further comprising:
receiving a list of results from the remote search engine in reply to the search request; and
displaying on the display screen a second graphical user interface comprising an area for displaying a list of results in reply to the search request and the command line interface area.

\* \* \* \* \*

UNITED STATES PATENT AND TRADEMARK OFFICE
CERTIFICATE OF CORRECTION

PATENT NO. : 9,459,765 B2
APPLICATION NO. : 12/398437
DATED : October 4, 2016
INVENTOR(S) : Sean Peter Carapella et al.

It is certified that error appears in the above-identified patent and that said Letters Patent is hereby corrected as shown below:

In the Claims

At Column 8, Claim number 1, Line number 62, after "including" delete ":"

At Column 9, Claim number 1, Line number 2, after "engine", delete "and" and at Line 5, change "parameters; and a translator coupling the command line interface area and the form-based command interface area, the translator comprising a computer program product including instructions executed by the processor for translating the string of the cryptic commands received in the selected cryptic code type into structured data representing the request parameters in response to receiving the cryptic commands input into the command line interface area, and pseudo-simultaneously displaying" to -- parameters, and the computer apparatus coupling the command line interface area and the form-based command interface area; and a computer program product comprising computer-executable instructions that, when executed by the processor, cause the computer apparatus to translate the string of the cryptic commands received in the selected cryptic code type into structured data representing the request parameters in response to receiving the cryptic commands input into the command line interface area, and to pseudo-simultaneously display --

Signed and Sealed this
Twenty-ninth Day of May, 2018

Andrei Iancu
*Director of the United States Patent and Trademark Office*